(12) United States Patent
Sugiyama

(10) Patent No.: US 8,596,672 B2
(45) Date of Patent: Dec. 3, 2013

(54) CURTAIN AIRBAG DEVICE PLACEMENT STRUCTURE

(75) Inventor: Takahiro Sugiyama, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 13/125,135

(22) PCT Filed: Mar. 4, 2010

(86) PCT No.: PCT/JP2010/053549
§ 371 (c)(1),
(2), (4) Date: Apr. 20, 2011

(87) PCT Pub. No.: WO2011/108101
PCT Pub. Date: Sep. 9, 2011

(65) Prior Publication Data
US 2012/0319383 A1    Dec. 20, 2012

(51) Int. Cl.
*B60R 21/16* (2006.01)
(52) U.S. Cl.
USPC ............... 280/728.2; 280/728.3; 280/730.2
(58) Field of Classification Search
USPC ................................. 280/728.2, 728.3, 730.2
See application file for complete search history.

(56) References Cited

U.S. PATENT DOCUMENTS

| | | | |
|---|---|---|---|
| 6,135,491 A | 10/2000 | Olson et al. | |
| 6,485,049 B1 | 11/2002 | Prottengeier et al. | |
| 2001/0022441 A1 | 9/2001 | Nakajima et al. | |
| 2004/0061316 A1 | 4/2004 | Elqadah et al. | |
| 2005/0062268 A1* | 3/2005 | Inoue et al. | 280/730.2 |
| 2005/0121887 A1* | 6/2005 | Inoue et al. | 280/730.2 |
| 2006/0061075 A1* | 3/2006 | Aoki et al. | 280/730.2 |
| 2006/0066079 A1* | 3/2006 | Inoue et al. | 280/730.2 |
| 2006/0108778 A1* | 5/2006 | Ochiai et al. | 280/730.2 |
| 2007/0035112 A1* | 2/2007 | Takahara | 280/730.2 |
| 2008/0129018 A1 | 6/2008 | Lim | |
| 2009/0091105 A1* | 4/2009 | Okimoto et al. | 280/728.3 |
| 2010/0127484 A1* | 5/2010 | Son | 280/730.2 |

FOREIGN PATENT DOCUMENTS

| | | |
|---|---|---|
| CN | 101195367 A | 6/2008 |
| JP | A-11-115674 | 4/1999 |

(Continued)

OTHER PUBLICATIONS

International Search Report issued in PCT/JP2010/053549, mailed Jun. 15, 2010. (with English-language translation).

*Primary Examiner* — Toan To
(74) *Attorney, Agent, or Firm* — Oliff & Berridge, PLC

(57) ABSTRACT

A curtain airbag device placement structure has an airbag module that is structured to include a curtain airbag folded-up in an elongated shape and an inflator supplying gas to the curtain airbag at a time of a side collision or the like, and that is assembled in advance to a top surface of a side terminal portion of a roof head lining. The inflator is disposed directly above a center pillar, and a pair of front and rear mounting leg portions of an inflator mounting bracket for fixing the inflator to a vehicle body are extended further toward a vehicle lower side than the side terminal portion of the roof head lining, and further, the inflator mounting bracket is fixed to the center pillar at the mounting leg portions.

13 Claims, 18 Drawing Sheets

(56) References Cited

FOREIGN PATENT DOCUMENTS

| JP | A 11-139238 | 5/1999 |
| JP | A-2001-277987 | 10/2001 |
| JP | A-2003-025944 | 1/2003 |
| JP | A 2004-074867 | 3/2004 |
| JP | A-2004-122921 | 4/2004 |
| JP | A-2004-182144 | 7/2004 |
| JP | A 2004-359044 | 12/2004 |
| JP | A-2008-247177 | 10/2008 |
| JP | A 2008-296644 | 12/2008 |
| JP | A 2010-042705 | 2/2010 |
| WO | WO 01/44027 A1 | 6/2001 |

* cited by examiner

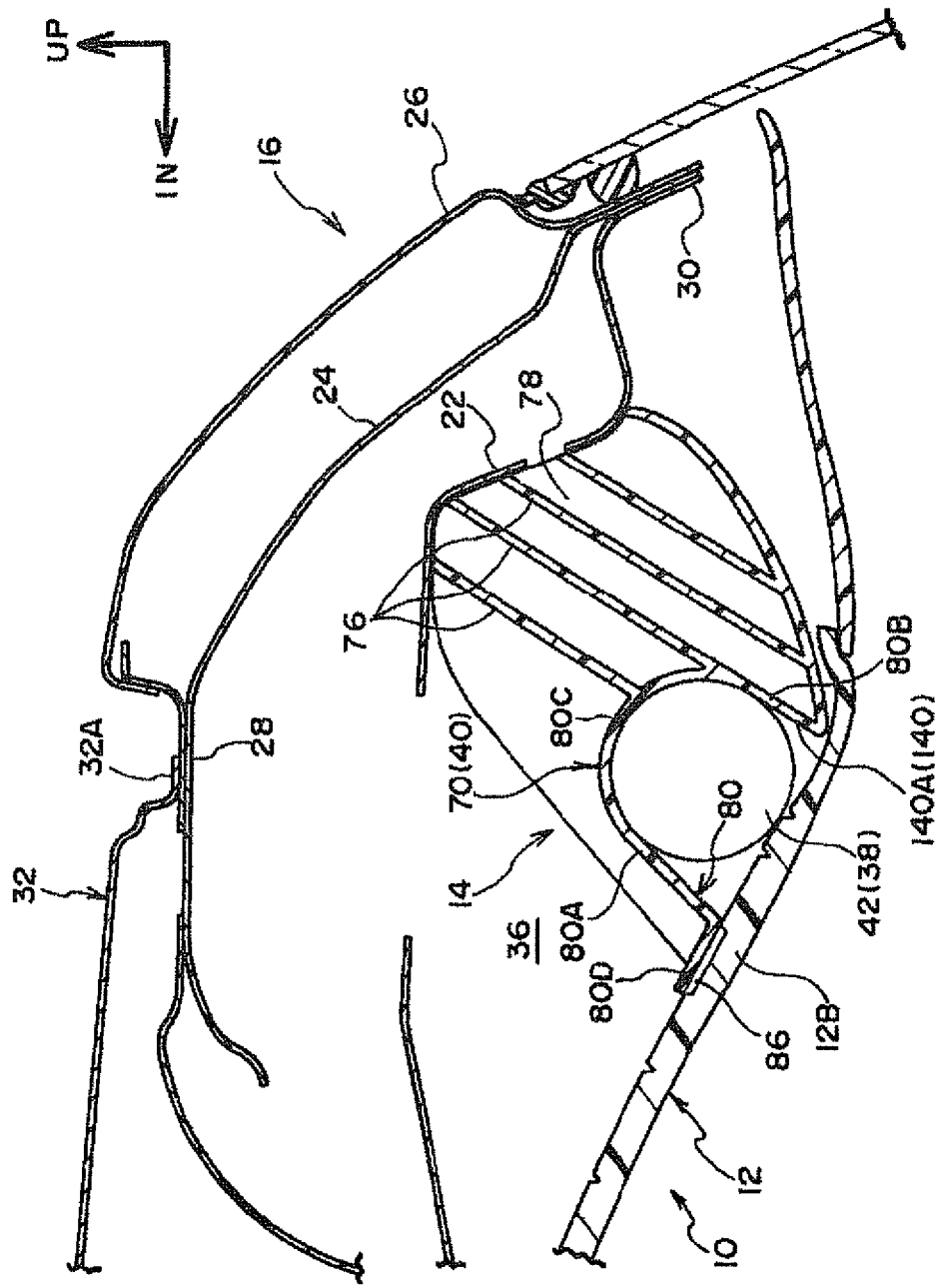

CURTAIN AIRBAG DEVICE PLACEMENT STRUCTURE

TECHNICAL FIELD

The present invention relates to a curtain airbag device placement structure.

BACKGROUND TECHNOLOGY

Conventionally, a curtain airbag device is installed as a device for protecting the head portion of a vehicle occupant at the time of a side collision. The curtain airbag device is structured to include a curtain airbag that is folded-up in an elongated shape, and an inflator that supplies gas to the curtain airbag at the time of a side collision.

In a case in which a curtain airbag device of the above-described structure is assembled in a vehicle, the inflator is fixed to a position along the roof side rail (e.g., at the rear side of the center pillar), and the curtain airbag is fixed to the roof side rail at predetermined intervals.

However, in a case in accordance with the above-described conventional method, the inflator that is a comparatively heavy object must be fixed to the body by ceiling work (work that the worker carries out while raising his/her hands toward the ceiling side). Therefore, there are the problems that the work posture of the worker is poor, and the work efficiency of the worker also deteriorates. Further, the curtain airbag is an elongated object, and the fact that there are many points at which it is fastened to the body also is a factor causing the above-described problems.

Patent Document 1: Japanese Patent Application Laid-Open No. 2004-359044

Patent Document 2: Japanese Patent Application Laid-Open No. 11-139238

DISCLOSURE OF THE INVENTION

Problems to be Solved by the Invention

In regard to the above-described topic, it has also been thought to apply the structures disclosed in the aforementioned two patent documents.

One is the prior art disclosed in Patent Document 1 (Japanese Patent Application Laid-Open No. 2004-359044). In this prior art, the roof side trim is placed at the vehicle transverse direction outer side of the roof head lining. Further, the inflator and the airbag are mounted in advance to the reverse surface side of this roof side trim, and thereafter, the roof side trim and the auxiliary side trim are assembled to the vehicle transverse direction outer side of the roof head lining. By doing so, ill effects due to mounting the curtain airbag device to the body by ceiling work are eliminated.

However, in a case in accordance with this prior art, in addition to the roof side trim, that is separate from the roof head lining, being needed, the auxiliary side trim that covers the inflator also is needed. Therefore, the number of parts is large, and the assembly work is troublesome. Accordingly, the burden of the work and the work efficiency of the worker are not sufficiently improved.

On the other hand, a technique of assembling, in advance, a curtain airbag device to the reverse surface sides of both side portions of the roof head lining is disclosed in Patent Document 2 (Japanese Patent Application Laid-Open No. 11-139238). To describe briefly, a head portion protecting airbag device has a pair of front and rear curtain airbags, a gas guiding tube that is disposed along the vehicle longitudinal direction and communicates the pair of front and rear curtain airbags, and an inflator that supplies gas to the gas guiding tube. On the other hand, a pair of front and rear cavities are respectively formed at the reverse surfaces of the both side portions of the roof head lining. The curtain airbags are disposed in these cavities, and the curtain airbags are co-fastened to the body by using bolts that fix assist grips.

However, in a case in accordance with this prior art, although the inflator is fixed by grips to the rear end portion of the roof head lining, when this structure is employed, the reaction force at the time when the inflator operates cannot be soundly received at the body.

In view of the above-described circumstances, an object of the present invention is to obtain a curtain airbag device placement structure that reduces the burden of work on a worker at the time of vehicle assembly, and can improve the work efficiency of the worker, and further, can reliably support, at the body, the reaction force that is applied when the curtain airbag device operates.

Means for Solving the Problems

A curtain airbag device placement structure relating to a first aspect has: an airbag module that is structured to include a curtain airbag folded-up in an elongated shape and an inflator supplying gas to the curtain airbag at a time of a side collision or a time of roll-over, and that is assembled in advance to a top surface of a side terminal portion of a roof head lining, wherein a lower end portion of an inflator mounting bracket for fixing the inflator to a vehicle body is extended further toward a vehicle lower side than the side terminal portion of the roof head lining, and the inflator mounting bracket is fixed to an intermediate pillar at the extended lower end portion of the inflator mounting bracket.

A curtain airbag device placement structure relating to a second aspect has the feature that, in the first aspect, the inflator is disposed directly above the intermediate pillar.

A curtain airbag device placement structure relating to a third aspect has the feature that, in the first or second aspect, the airbag module is fixed to the roof head lining by a cover that is made of resin and that is formed in an elongated shape along the airbag module.

A curtain airbag device placement structure relating to a fourth aspect has the feature that, in the third aspect, an expanding direction limiting portion, that is extended along an expanding direction of the curtain airbag and has a guide surface of a time when the curtain airbag expands, is provided at the cover or the inflator mounting bracket.

A curtain airbag device placement structure relating to a fifth aspect has the feature that, in any one of the first through fourth aspects, the inflator is disposed beneath the curtain airbag.

A curtain airbag device placement structure relating to a sixth aspect has the feature that, in the fifth aspect, the curtain airbag is folded-up in a roll shape, and an inflator insertion portion, into which a gas jetting portion of the inflator is inserted, is formed at an upper edge central portion of the curtain airbag, and further, a connecting portion with the inflator insertion portion at the curtain airbag in a folded-up state is disposed facing toward a vehicle lower side.

A curtain airbag device placement structure relating to a seventh aspect has the feature that, in any one of the first through fourth aspects, the inflator is disposed above the curtain airbag.

A curtain airbag device placement structure relating to an eighth aspect has the feature that, in any one of the first through seventh aspects, excess length portions are provided between an inflator mounted position at the inflator mounting bracket and a fixing position to the intermediate pillar.

A curtain airbag device placement structure relating to a ninth aspect has the feature that, in the eighth aspect, the excess length portions are structured as projecting portions that project toward a vehicle cabin inner side, and engaging portions engageable with the projecting portions are provided at the cover.

A curtain airbag device placement structure relating to a tenth aspect has the feature that, in any one of the third through ninth aspects, an accommodating portion, that accommodates the curtain airbag and the inflator between the accommodating portion and the side terminal portion of the roof head lining, is formed at the cover, and a displacement limiting portion, that, when the accommodating portion is displaced in a pushing-up direction of the side terminal portion of the roof head lining, interferes with the vehicle body and limits displacement of the side terminal portion of the roof head lining, is provided at an outer side of the accommodating portion.

A curtain airbag device placement structure relating to an eleventh aspect has the feature that, in any one of the third through tenth aspects, a holding portion, that holds a wiring article that is wired at a top surface side of the side terminal portion of the roof head lining, is provided at the cover.

A curtain airbag device placement structure relating to a twelfth aspect has the feature that, in any one of the third through eleventh aspects, a base for fixing an assist grip is provided at the roof side rail, and the side terminal portion of the roof head lining is fixed, together with the cover, to the base by the assist grip.

A curtain airbag device placement structure relating to a thirteenth aspect has the feature that, in the twelfth aspect, a fastener, that is elastically engaged with a mounting hole of the base, is set at a distal end portion of the assist grip, and the fastener also functions as a temporary fixing member that temporarily fixes the airbag module and the cover to the side terminal portion of the roof head lining.

In accordance with the first aspect, the airbag module is assembled in advance to the top surface of the side terminal portion of the roof head lining. Accordingly, when the roof head lining in this state is assembled to the vehicle body, the airbag module is disposed at a position that runs along the roof side rail.

Here, in the present aspect, as described above, when the roof head lining is assembled to the vehicle body, the lower end portion of the inflator mounting bracket is extended further toward the vehicle lower side than the side terminal portion of the roof head lining. Namely, in the present aspect, when the roof head lining is assembled to the vehicle body, the lower end portion of the inflator mounting bracket, that is for fixing the inflator to the vehicle body, is in a state of hanging-down further toward the vehicle lower side than the side terminal portion of the roof head lining. Accordingly, if the worker fixes the lower end portion of the inflator mounting bracket, that is in front of his/her eyes, to the intermediate pillar, the work of fixing the inflator to the intermediate pillar is completed. Accordingly, the work of fixing the inflator is not ceiling work. Further, because the inflator that is a heavy object is fixed to the intermediate pillar that is a vehicle body structural member, the reaction force, that is applied when the curtain airbag device operates, can be reliably received at the intermediate pillar.

In accordance with the second aspect, because the inflator is disposed directly above the intermediate pillar, the distance between the inflator and the fixing point of the inflator mounting bracket to the intermediate pillar is short as compared with a case in which the inflator is disposed at the vehicle rear side or the vehicle front side of the intermediate pillar. Accordingly, the extended length of the lower end portion of the inflator mounting bracket is shorter by that much.

In accordance with the third aspect, the airbag module is fixed to the top surface of the side terminal portion of the roof head lining by a cover that is made of resin and that is formed in an elongated shape along the airbag module. By fixing the airbag module to the roof head lining by using the elongated cover that runs along the airbag module in this way, the airbag module can be assembled to the top surface of the side terminal portion of the roof head lining in a stable state.

Moreover, by using the cover, the curtain airbag can be prevented in advance from hitting edges of body panels or burrs of spot welded places or the like and being damaged, at the time of assembling, to the vehicle body, the roof head lining after assembly of the airbag module, and at the time when the curtain airbag device operates.

In accordance with the fourth aspect, because the inflator is disposed beneath the curtain airbag, the distance between the inflator and the fixing point of the inflator mounting bracket to the intermediate pillar is short as compared with a case in which the inflator is disposed above the curtain airbag. Accordingly, the extended length of the lower end portion of the inflator mounting bracket is shorter by that much.

In accordance with the fifth aspect, when the curtain airbag expands, the curtain airbag is guided by the guide surface of the expanding direction limiting portion, that is provided at the cover or the inflator mounting bracket, and expands. Because this guide surface is extended along the expanding direction of the curtain airbag, the curtain airbag is expanded smoothly in the predetermined expanding direction. In other words, in the present aspect, the expanding direction of the curtain airbag is limited by the guide surface of the expanding direction limiting portion. Accordingly, the curtain airbag is prevented from expanding in an unplanned space between the intermediate pillar garnish and the intermediate pillar, or the like.

In accordance with the sixth aspect, because the curtain airbag is folded-up in the roll shape, the gas that is jetted from the gas jetting portion of the inflator is jetted into the inflator insertion portion that is provided at the upper edge central portion of the curtain airbag. Moreover, the gas is supplied from the inflator insertion portion into the curtain airbag that is folded-up in the roll shape. As a result, the curtain airbag that is folded-up in the roll shape proceeds to expand in the direction in which the rolled folding thereof comes undone.

Here, in the present aspect, because the connecting portion with the inflator insertion portion at the curtain airbag in the folded-up state is disposed facing toward the vehicle lower side, the gas is always jetted toward the vehicle lower side. Therefore, the curtain airbag is reliably expanded toward the vehicle lower side even when the inflator is disposed lower than the curtain airbag.

In accordance with the seventh aspect, because the inflator is disposed above the curtain airbag, the present aspect can be applied even to cases of a body structure in which the inflator cannot be disposed beneath the curtain airbag.

In accordance with the eighth aspect, because the excess length portions are provided between the inflator mounted position at the inflator mounting bracket and the fixing position to the intermediate pillar, when load in a direction of thrusting the side terminal portion of the roof head lining upward is applied thereto, the excess length portions are extended (deformed). Due thereto, the inflator can be displaced in the thrusting-up direction with respect to the side terminal portion. Further, when the excess length portions extend, energy also is absorbed.

In accordance with the ninth aspect, the excess length portions are structured as projecting portions that project toward the vehicle cabin inner side, and engaging portions provided at the cover are engaged with the projecting portions. Due thereto, the positioning of the cover with respect to the inflator mounting bracket is easy. Accordingly, the positioning work at the time of assembling the airbag module to the top surface of the side terminal portion of the roof head lining is easy.

In accordance with the tenth aspect, when load in a direction of pushing-up the side terminal portion of the roof head lining is applied thereto, the cover that is disposed at the top surface of the side terminal portion also starts to be displaced in the same direction. However, in the present aspect, because the displacement limiting portion is provided at the accommodating portion of the cover, the displacement limiting portion interferes with the vehicle body. Therefore, the cover, and accordingly the side terminal portion, is hardly displaced at all in the pushing-up direction of the side terminal portion.

In accordance with the eleventh aspect, the holding portion is provided at the cover, and this holding portion can be made to hold a wiring article. Therefore, until the roof head lining is assembled to the vehicle body, the wiring article such as a wire harness or an antenna or the like can be prevented from shifting from the predetermined wiring position.

In accordance with the twelfth aspect, the side terminal portion of the roof head lining is fixed by the assist grip to the base that is provided at the roof side rail. At this time, the cover, that is disposed at the top surface of the side terminal portion of the roof head lining, also is fixed together.

In accordance with the thirteenth aspect, the fastener, that is elastically engaged with a mounting hole of the base, is set at the distal end portion of the assist grip, and the fastener also functions as a temporary fixing member that temporarily fixes the airbag module and the cover to the side terminal portion of the roof head lining. Therefore, before the roof head lining is assembled to the vehicle body, the airbag module and the cover can be temporarily fixed to the top surface of the side terminal portion of the roof head lining.

Effects of the Invention

As described above, the curtain airbag device placement structure relating to the first aspect has the excellent effects that the burden of work on a worker at a time of vehicle assembly is lessened and the work efficiency of the worker can be improved, and further, reaction force that is applied when curtain airbag device operates can be reliably supported at the body.

The curtain airbag device placement structure relating to the second aspect has the excellent effects that compactness of the inflator mounting bracket can be aimed for, and the distance between the inflator and the fixing point of the inflator mounting bracket to the intermediate pillar is short, and the reaction force applied when the curtain airbag expands can be efficiently transmitted to the intermediate pillar.

The curtain airbag device placement structure relating to the third aspect has the excellent effects that the airbag module can be assembled to the roof head lining and made into a sub-assembly simply and in a stable state, and the curtain airbag can be protected from damage.

The curtain airbag device placement structure relating to the fourth aspect has the excellent effect that the curtain airbag can be expanded smoothly toward beneath the roof side rail at the time of a side collision.

The curtain airbag device placement structure relating to the fifth aspect has the excellent effects that compactness of the inflator mounting bracket can be aimed for, and the distance between the inflator and the fixing point of the inflator mounting bracket to the intermediate pillar is short, and the reaction force applied when the curtain airbag expands can be efficiently transmitted to the intermediate pillar.

The curtain airbag device placement structure relating to the sixth aspect has the excellent effect that the curtain airbag can be rapidly expanded toward the vehicle lower side even when the inflator is disposed lower than the curtain airbag.

The curtain airbag device placement structure relating to the seventh aspect has the excellent effect that the degrees of freedom in application to vehicle types can be increased.

The curtain airbag device placement structure relating to the eighth aspect has the excellent effect that, even if the head portion of the vehicle occupant strongly abuts the side terminal portion of the roof head lining, a large reaction force is not inputted from the inflator to the head portion of the vehicle occupant.

The curtain airbag device placement structure relating to the ninth aspect has the excellent effect that the work efficiency at the time of assembling the airbag module to the top surface of the side terminal portion of the roof head lining can be improved.

The curtain airbag device placement structure relating to the tenth aspect has the excellent effect that, when the vehicle occupant pushes the side terminal portion of the roof head lining by his/her hand, or the like, the side terminal portion of the roof head lining inadvertently flexing (loosening) can be suppressed.

The curtain airbag device placement structure relating to the eleventh aspect has the excellent effect that a wiring article, such as a wire harness or an antenna or the like, moving and getting in the way of work can be prevented in advance, and accordingly, the work efficiency in assembling the roof head lining to the vehicle body can be improved.

The curtain airbag device placement structure relating to the twelfth aspect has the excellent effect that the elongated cover can be soundly fixed along the roof side rail.

The curtain airbag device placement structure relating to the thirteenth aspect has the excellent effects that the work efficiency in assembling the airbag module and the roof head lining to the vehicle body can be improved, and the burden of work on the worker can be lessened.

BRIEF DESCRIPTION OF THE DRAWINGS

FIG. 14 is an enlarged sectional view of main portions showing, in an enlarged manner, a state cut along line F14-F14 of FIG. 1.

PREFERRED FORMS FOR EMBODYING THE INVENTION

First Embodiment

A first embodiment of a curtain airbag device placement structure relating to the present invention is described hereinafter by using FIG. 1 to FIG. 15. Note that arrow FR shown appropriately in these drawings indicates the vehicle forward side, arrow UP indicates the vehicle upper side, and arrow IN indicates the vehicle transverse direction inner side.

<<Overall Structure>>

Figure 1:
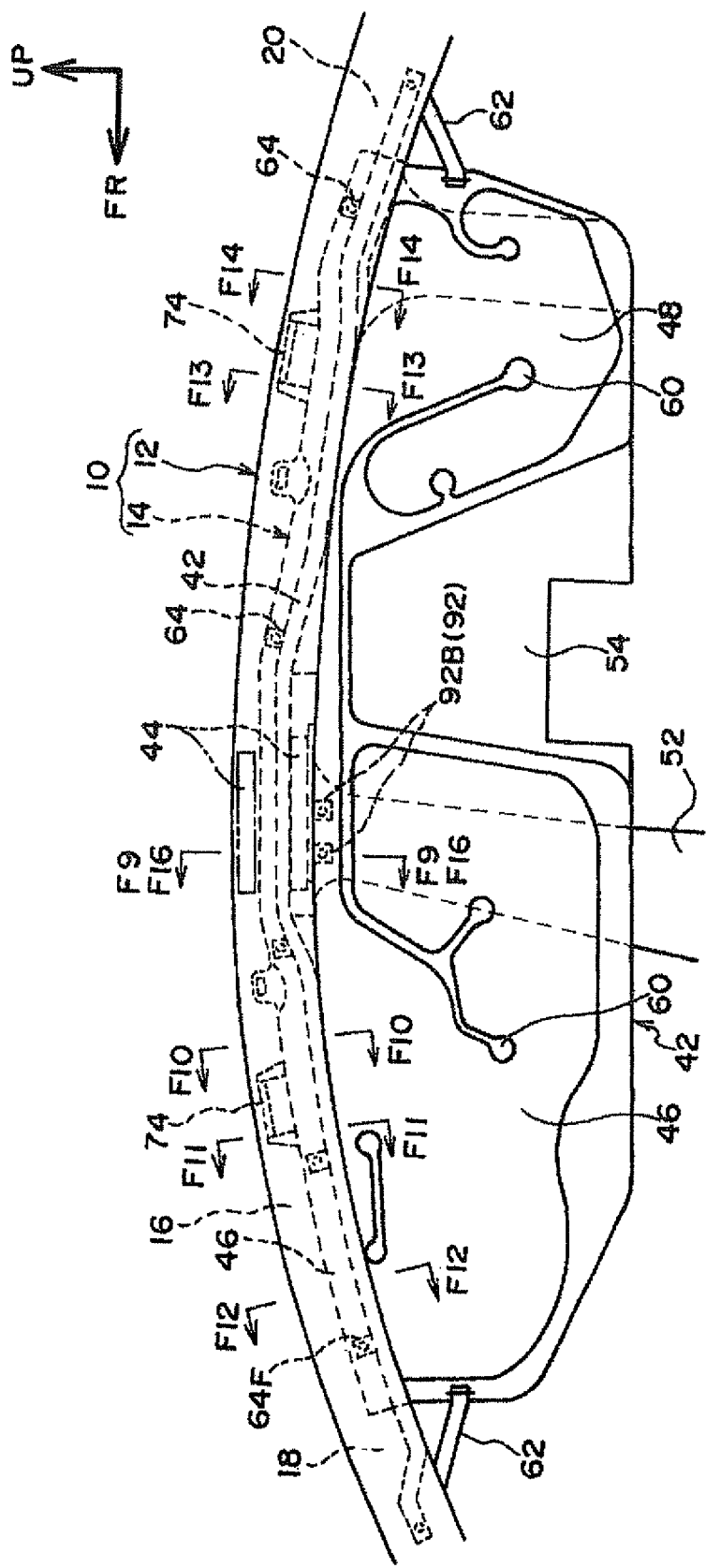
FIG. 1 is a side view showing an operated state of a curtain airbag device relating to a first embodiment, as seen from a vehicle cabin inner side.
Figure 2:
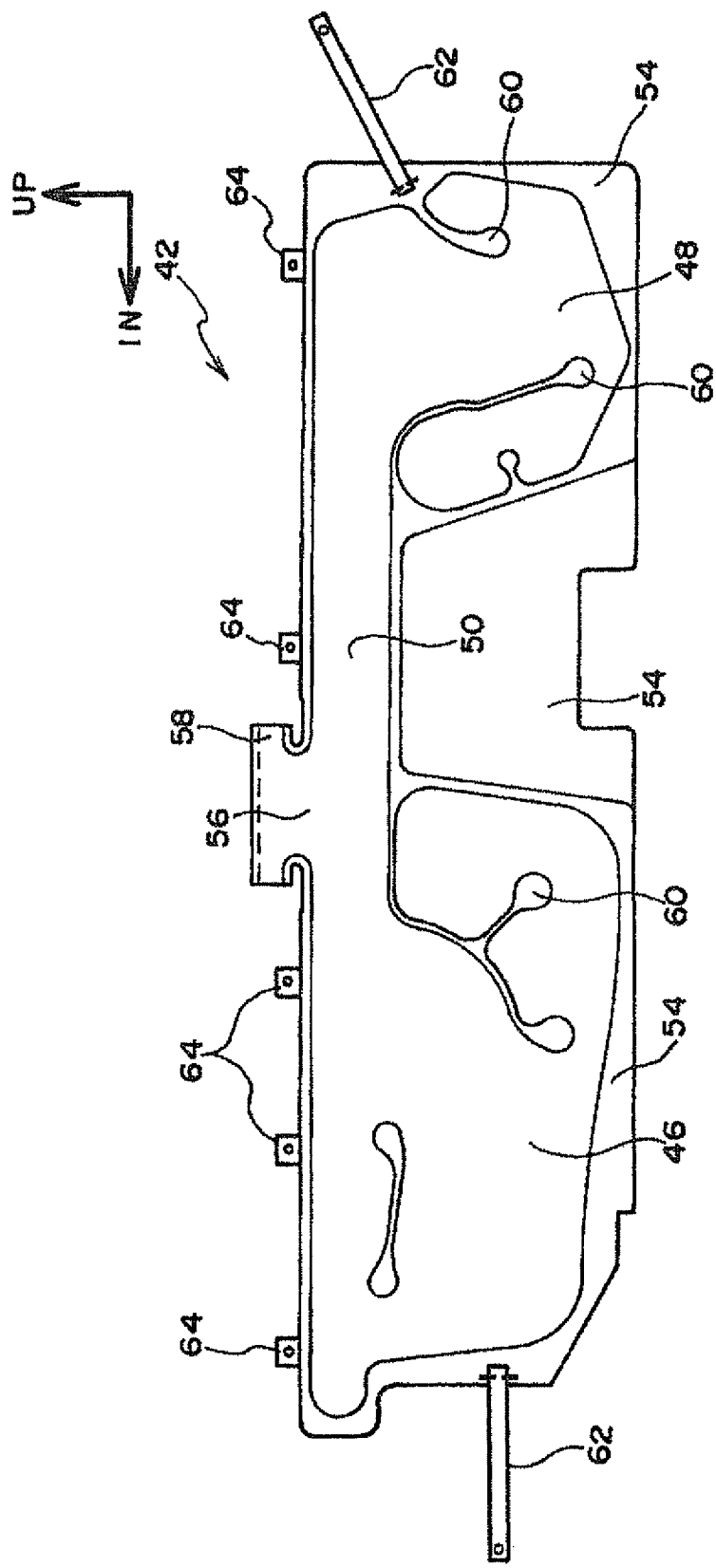
FIG. 2 is a plan view showing a planar expanded state of a single part that is a curtain airbag shown in FIG. 1.

A side view viewing, from a vehicle cabin inner side, a state in which a curtain airbag device has operated is shown in FIG. 1. Further, a plan view of a single part showing a planar expanded state of a curtain airbag shown in FIG. 1 is shown in FIG. 2. Moreover, a schematic perspective view of a ceiling module is shown in FIG. 3, and an overall perspective view of the curtain airbag device is shown in FIG. 4.

Figure 3:
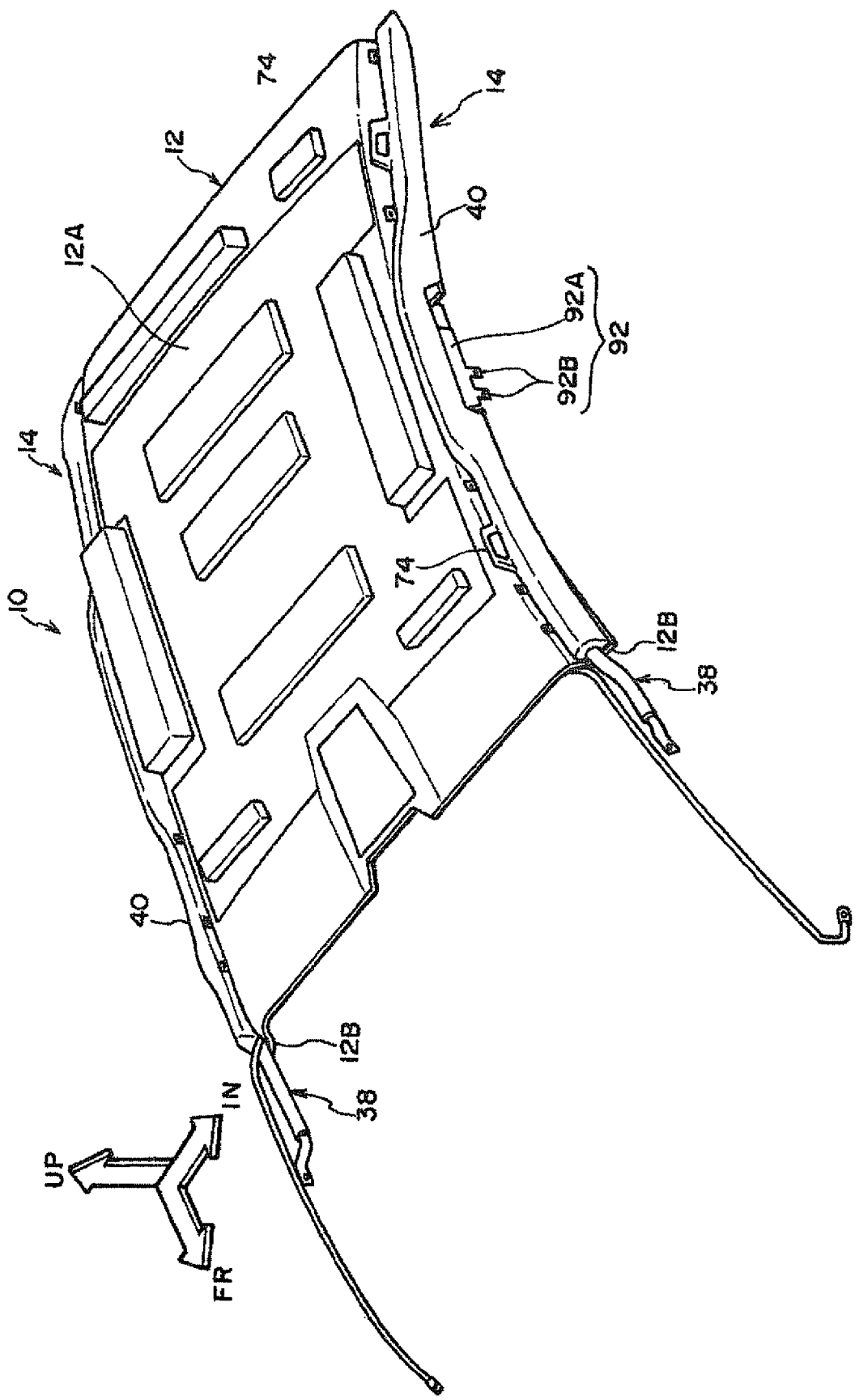
FIG. 3 is a schematic perspective view showing a ceiling module in which the curtain airbag device shown in FIG. 1 is assembled.
Figure 4:
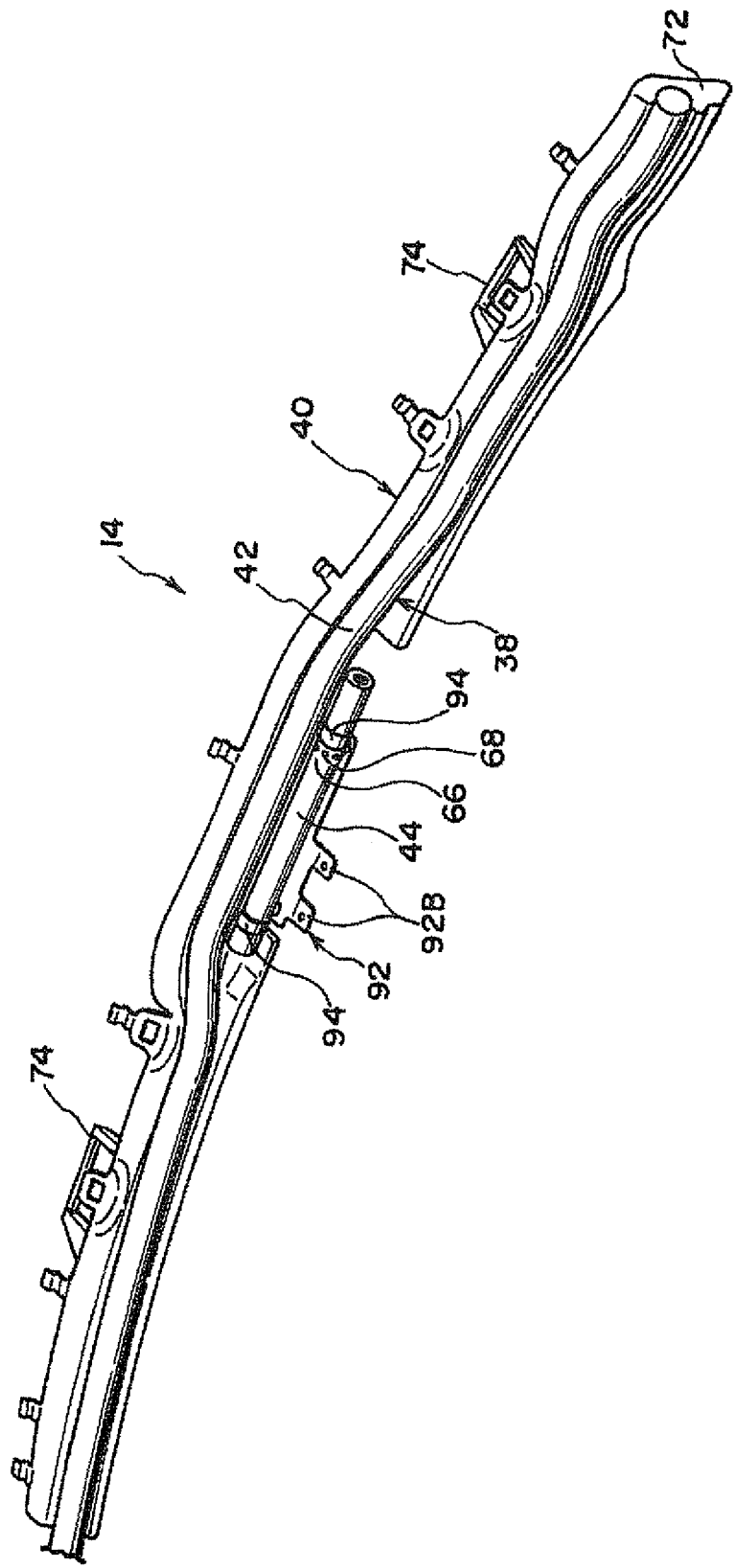
FIG. 4 is an overall perspective view of the curtain airbag device shown in FIG. 3.
Figure 5:
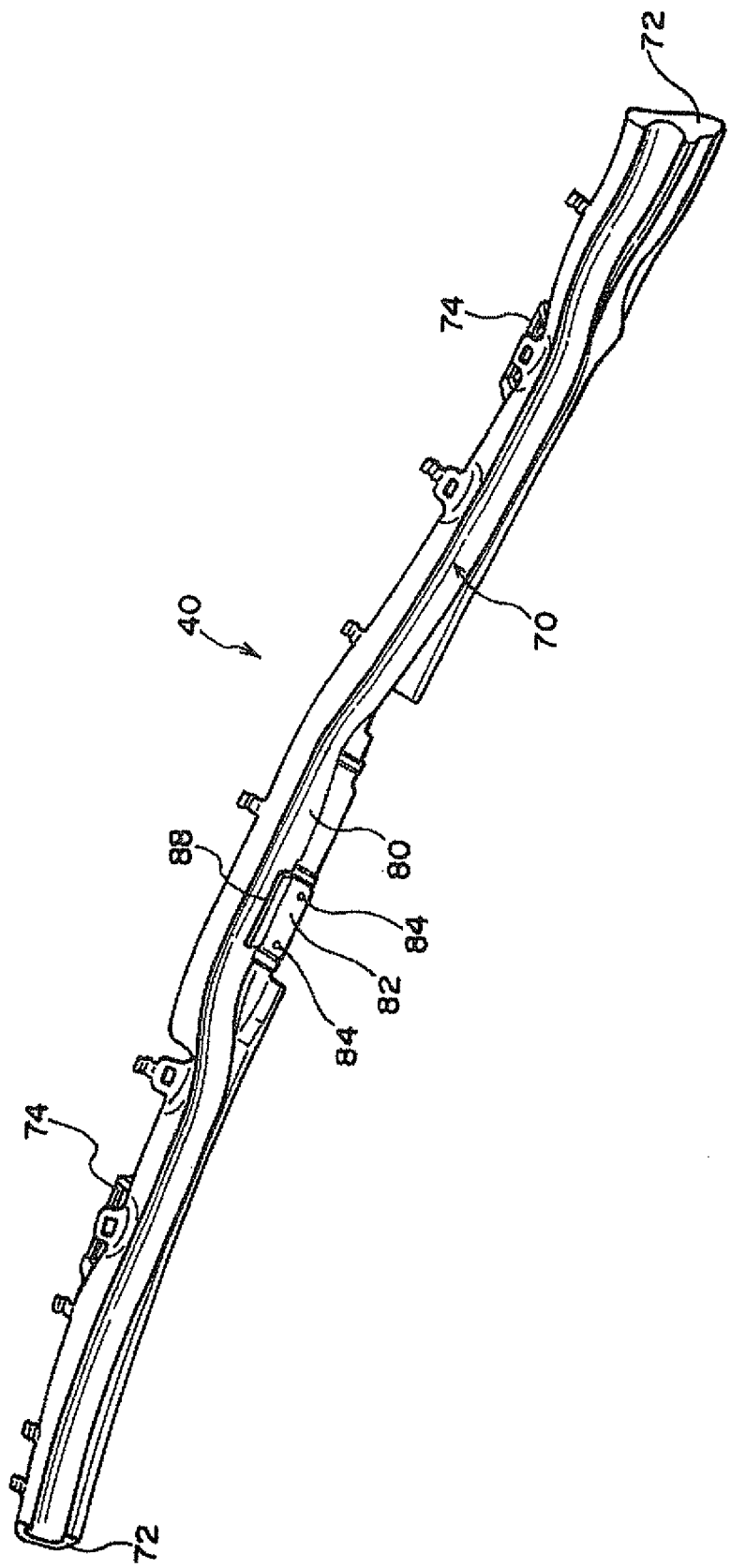
FIG. 5 is a perspective view showing, as a unit, a cover shown in FIG. 4.

As shown in FIG. 3, a ceiling module 10 is structured by a roof head lining 12 that is a molded ceiling, and a pair of left and right curtain airbag devices 14 that are respectively mounted to a pair of left and right side terminal portions 12B of the roof head lining 12. The roof head lining 12 is formed in a substantially rectangular shape in plan view, and is formed in the curved surface shape that is slightly curved overall. Further, the pair of left and right side terminal portions 12B of the roof head lining 12 are formed in concave shapes that are a step down from a main body portion 12A of the roof head lining 12. The curtain airbag devices 14 are assembled to the top surfaces of these concave-shaped side terminal portions 12B.

As shown in FIG. 1, in a state in which the ceiling module 10 of the above-described structure is assembled to the lower side of a roof panel, the curtain airbag devices 14 are placed along the longitudinal directions of roof side rails 16 at the vehicle cabin inner side of the roof side rails 16. Note that the curtain airbag devices 14 are placed in a range that extends from front pillars 18 via the roof side rails 16 to rear pillars 20.

Figure 10:
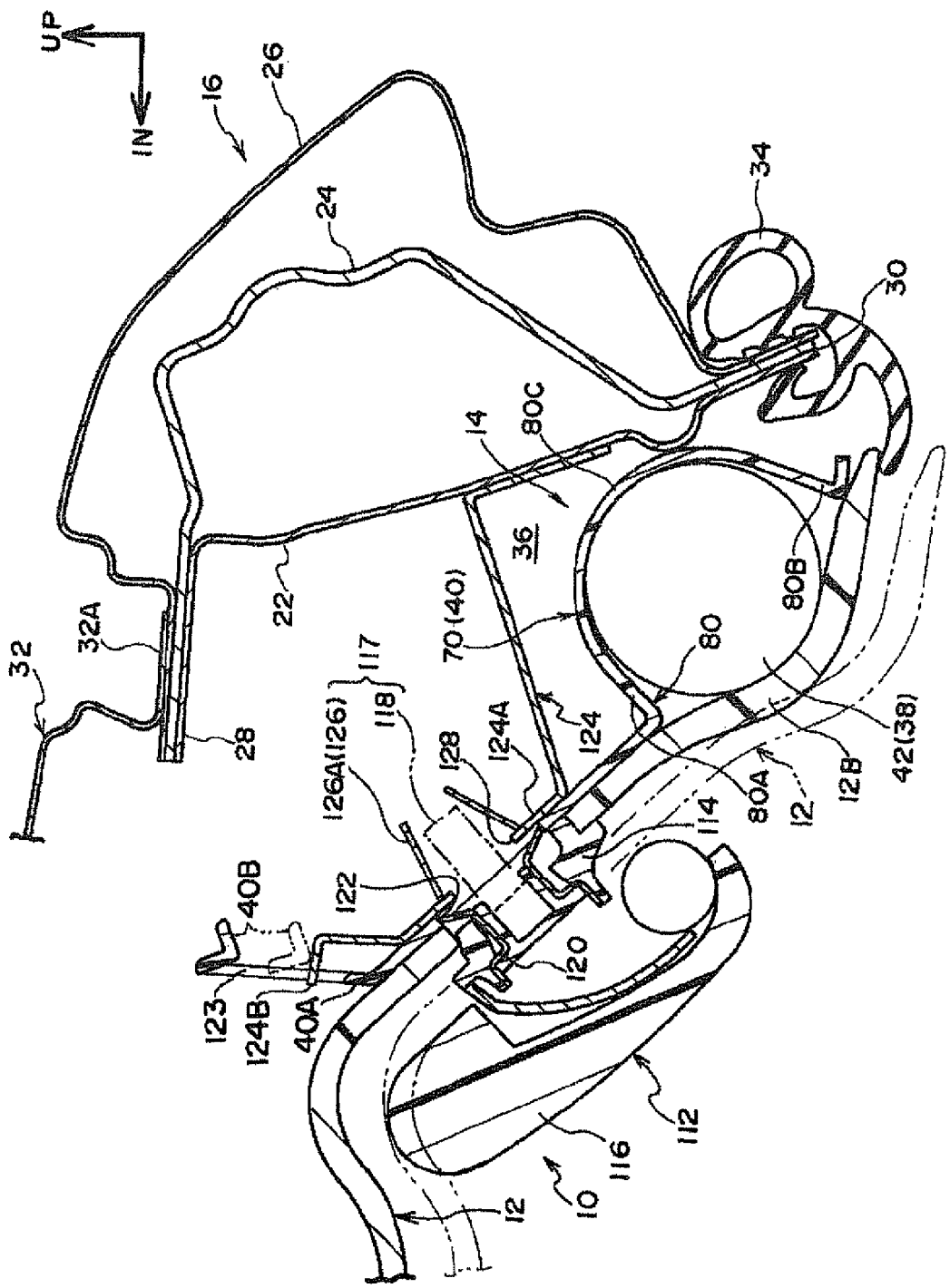
FIG. 10 is an enlarged sectional view of main portions showing, in an enlarged manner, a state cut along line F10-F10 of FIG. 1.

Here, the body structure around the roof side rail 16 will be touched upon briefly. As shown in FIG. 10 and the like, the roof side rail 16 is structured by a roof side rail inner panel 22 that is disposed at the vehicle cabin inner side, a roof side rail reinforcement 24 that is disposed at the vehicle cabin outer side and forms a closed cross-section between the roof side rail reinforcement 24 and the roof side rail inner panel 22, and a side outer panel 26 that is disposed at the vehicle cabin outer side of the roof side rail reinforcement 24 and structures the design surface. The respective upper end flange portions of the roof side rail inner panel 22, the roof side rail reinforcement 24 and the side outer panel 26 are superposed in three layers and are extended horizontally toward the vehicle transverse direction inner side (hereinafter, this portion that is layered in three layers is called an "upper end flange portion 28"). Further, the respective lower end flange portions of the roof side rail inner panel 22, the roof side rail reinforcement 24 and the side outer panel 26 are layered in three layers and are extended substantially perpendicularly downward at an incline toward the vehicle outer side (hereinafter, this portion that is layered in three layers is called a "lower end flange portion 30"). Further, the upper end flange portion 28 and the lower end flange portion 30 respectively are joined by spot welding. Moreover, a transverse direction end portion 32A of a roof panel 32 is joined to the top surface of the upper flange portion 28. Still further, a door opening trim 34 is elastically fit and attached to the lower end flange portion 30. Further, the roof side rail inner panel 22 is disposed in a state in which the upper portion is inclined, with respect to the vehicle vertical direction, a predetermined angle further toward the vehicle transverse direction inner side than the lower portion.

A predetermined accommodating space 36 is formed between the roof side rail inner panel 22 of the roof side rail 16 of the above-described structure and the side terminal portion 12B of the roof head lining 12. The curtain airbag device 14 is placed in this accommodating space 36.

As shown in FIG. 1 and FIG. 4, the curtain airbag device 14 relating to the present embodiment is structured to include an airbag module 38, and a cover 40 that covers the airbag module 38. Because the structure of the cover 40 is described in detail below, here, the structure of the airbag module 38 is summarized.

The airbag module 38 is structured to include a curtain airbag 42, that has a length extending from the front pillar 18 to the rear pillar 20 and that is expanded spanning over the front and rear seats, and an inflator 44 that supplies gas to this curtain airbag 42 at the time of a side collision.

As shown in FIG. 2, the curtain airbag 42 has a front side inflating portion 46 for protecting the head portion of a vehicle occupant seated in a front seat, a rear side inflating portion 48 for protecting the head portion of a vehicle occupant seated in a rear seat, a communication path 50 that communicates the front side inflating portion 46 and the rear side inflating portion 48 at the upper edge sides thereof, a non-inflating portion 54 that is set at the rear of a portion corresponding to a center pillar 52 (see FIG. 1) that serves as an intermediate pillar between a bag outer peripheral portion and the front side inflating portion 46 and the rear side inflating portion 48, and an inflator insertion portion 58 that is set at the central portion of the upper edge side and is communicated with the communication portion 50 via a connecting portion 56. Non-inflating portions 60 are formed also within the front side inflating portion 46 and rear side inflating portion 48. Further, the inflator 44 can be inserted in the inflator insertion portion 58. Moreover, strap-shaped tension belts 62 are respectively mounted to the front end portion and the rear end portion of the curtain airbag 42. Further, plural tabs 64 for mounting are provided at predetermined intervals at the upper edge portion of the curtain airbag 42.

Figure 6:
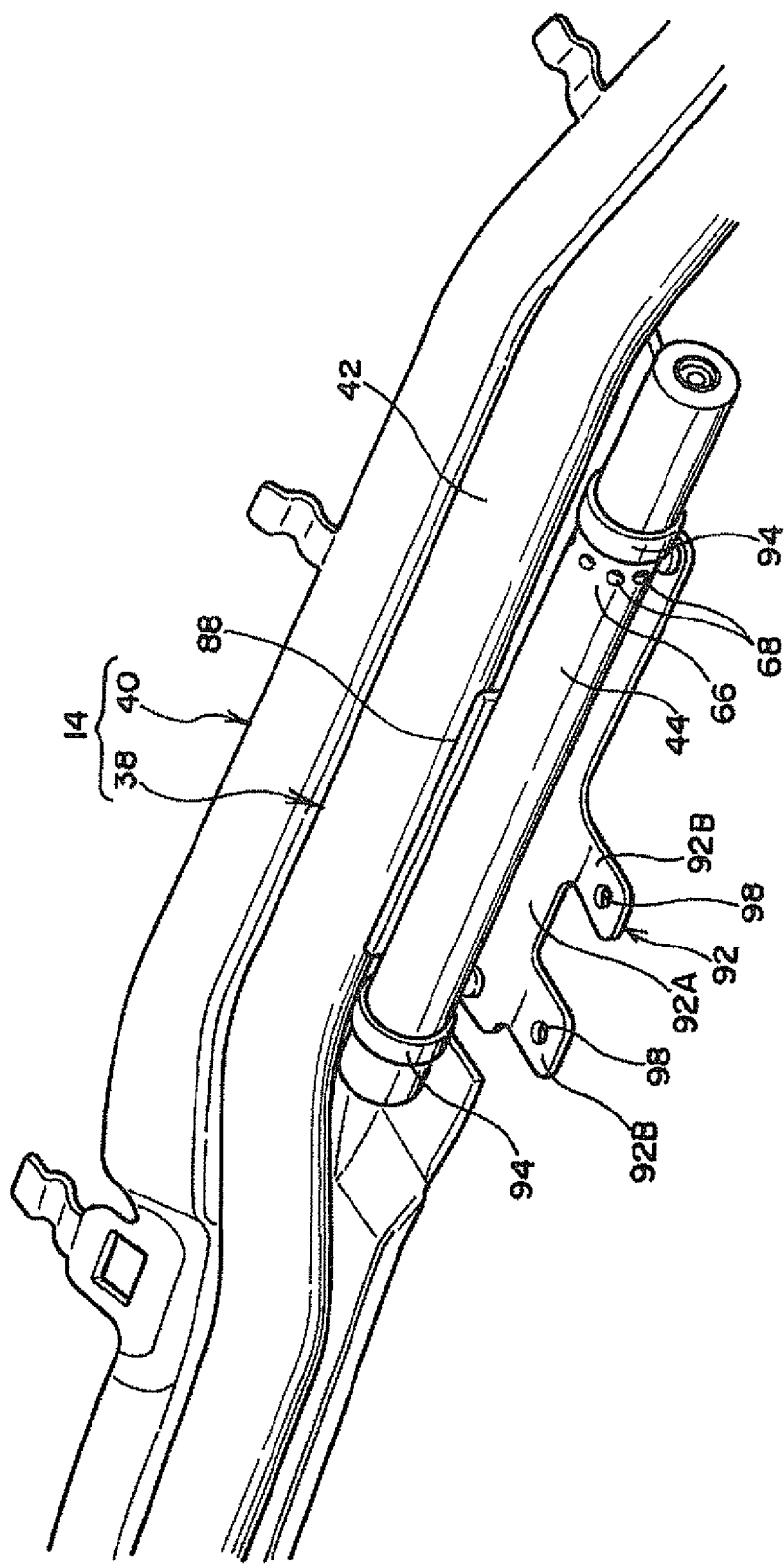
FIG. 6 is an enlarged perspective view of main portions centering around an inflator and an inflator mounting bracket shown in FIG. 4.

As shown in FIG. 1, FIG. 4 and FIG. 6, the inflator 44 is formed in a substantially cylindrical shape. A gas jetting portion 66 is provided in a vicinity of one end portion of the inflator 44, and plural gas jetting holes 68 are formed at predetermined intervals in the outer peripheral portion of the gas jetting portion 66. The inflator 44 is caulked and fixed by clamps 94 to an inflator mounting bracket 92 described below at two places at the front and the rear, in a state of being inserted in the inflator insertion portion 58 of the curtain airbag 42, such that the gas that is jetted-out from the gas jetting holes 68 is supplied to the curtain airbag 42 interior.

<<Structure of Main Portions>>

<Structure of Cover (Resin Case)>

As shown in FIG. 4 through FIG. 8 (and FIG. 5 in particular), the above-described airbag module 38 is mounted in the cover (resin case) 40. The cover 40 has the same length as the airbag module 38, and is formed of resin. An accommodating portion 70, that is concave and is for accommodating the airbag module 38, is formed at the transverse direction central portion of the cover 40 over the entire length of the cover 40. The both end portions in the longitudinal direction of the cover 40 are closed by walls 72. Further, handles 74, that are upside-down U-shaped, are formed integrally at two places at the front and rear of the cover 40. Moreover, plural lateral ribs 76 (see FIG. 7), that are disposed in parallel at predetermined intervals, are formed at the reverse surface side of the cover 40 over the entire length of the cover 40. Further, plural heightwise ribs 78, that connect the lateral ribs 76 at right angles, are formed in parallel at predetermined intervals at appropriate positions in the longitudinal direction of the cover 40. Note that the walls 72, that are disposed at the both longitudinal direction end portions of the above-described cover 40, are also the heightwise ribs 78. Both the lateral ribs 76 and heightwise ribs 78 are set with the object of reinforcing the cover 40.

Figure 9:
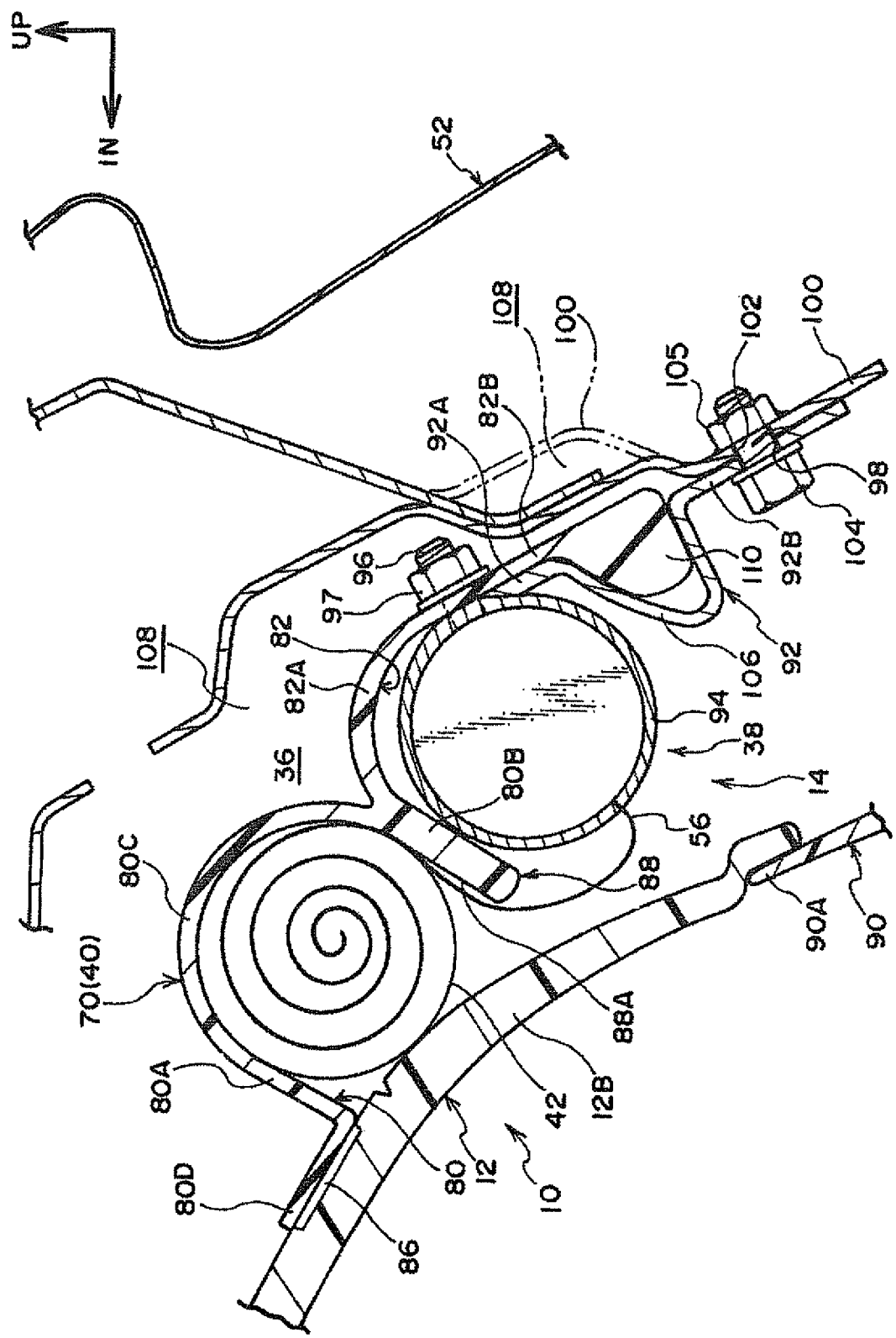
FIG. 9 is an enlarged sectional view of main portions showing, in an enlarged manner, a state cut along line F9-F9 of FIG. 1.

Here, an enlarged longitudinal sectional view (an enlarged sectional view of line F9-F9 of FIG. 1) at the center pillar (hereinafter appropriately called "B-pillar") portion, in the state in which the ceiling module 10 that has the curtain airbag devices 14 is assembled to the vehicle body, is shown in FIG. 9. As shown in this drawing, the accommodating portion 70 of the cover 40 has a bag accommodating portion 80 that is formed in a substantial U-shape, and an inflator mounting portion 82 that is integrally formed adjacent to this bag accommodating portion 80. The bag accommodating portion 80 has an inner left portion 80A that is disposed perpendicular to the roof head lining 12, an outer leg portion 80B that is disposed parallel to the inner leg portion 80A, and a bottom portion 80C that connects the inner leg portion 80A and the outer leg portion 80B in an arc shape. The curtain airbag 42, that is folded-up in the roll shape, is accommodated in this bag accommodating portion 80. Looking at it differently, the curtain airbag 42 is accommodated in the space that is formed between the bag accommodating portion 80 of the cover 40 and the side terminal portion 12B of the roof head lining 12. Further, due to the curtain airbag 42 being covered from the vehicle transverse direction outer side by the bag accommodating portion 80 of the cover 40, the curtain airbag 42 is protected from damage due to contact with edges of body panels or burrs of spot welding.

On the other hand, the inflator mounting portion 82 is extended (hereinafter, this portion is called an "extended portion 82B") from the outer leg portion 80B of the bag accommodating portion 80 toward the pillar lower side via a curved portion 82A that is formed in an arc shape, and the cross-sectional shape thereof is a substantially upside-down J-shape. A pair of bolt insert-through holes 84 (see FIG. 5), through which are inserted stud bolts 96 that are provided so as to stand at the inflator mounting bracket 92 described below, are formed at the extended portion 82B. Due to the stud bolts 96, that are provided so as to stand at the inflator mounting bracket 92, being inserted into these bolt insert-through holes 84 and nuts 97 being screwed-together therewith, the inflator mounting bracket 92 is fixed to the cover 40.

Further, the cabin inner side end portion of the inner leg portion 80A of the above-described bag accommodating portion 80 is bent along the top surface of the roof head lining 12, and this bent portion 80D is welded (hereinafter called "welded portion 86") by hot inciting to the top surface of the roof head lining 12. To supplementarily explain this point, when assembling the curtain airbag device 14 to the top surface of the side terminal portion 12B of the roof head lining 12, welding by hot melting is carried out, and assembling (temporary placing) of the curtain airbag device 14 to the roof head lining 12 by using assist grips 112, 142 that are described below is carried out. Then, at the time of finally assembling the ceiling module 10 to the vehicle body, fastening and fixing to the body panel by using the assist grips 112, 142, and fastening and fixing to the center pillar 52 by using the inflator mounting bracket 92 that is described below, are carried out, and the ceiling module 10, to which the curtain airbag 14 has been assembled in advance, is thereby mounted to the vehicle body.

<Structure of B-Pillar Portion Jump Stand>

Further, the outer leg portion 80B of the bag accommodating portion 80 is extended toward the side terminal portion 12B of the roof head lining 12, and structures a jump stand 88 (see FIG. 5 and FIG. 6 as well) that serves as an expanding direction limiting portion. Namely, the jump stand 88 is structured by the outer leg portion 80B itself that is extended downward at an incline toward the cabin inner side of the vehicle. The top surface of this jump stand 88 is made to be a guide surface 88A that limits the expanding direction of the curtain airbag 42.

Namely, as can be understood from the description up until now, the cover 40 of the present embodiment is a member that bears the role of fixing the airbag module 38 to the top surface of the side terminal portion 12B of the roof head lining 12, the role of a protector that, at times when the curtain airbag 42 expands and the like, prevents the curtain airbag 42 from directly abutting the body panel and being damaged, and the role of, when the curtain airbag 42 expands, receiving the reaction force and limiting the expanding direction of the curtain airbag 42.

Note that the distal end portion of the jump stand 88 is disposed at a position that is apart, by a predetermined distance, from the top surface of the side terminal portion 1213 of the roof head lining 12. Due thereto, the portions from the connecting portion 56 on of the curtain airbag 42 can be inserted-through from the inflator mounting portion 82 side toward the bag accommodating portion 80 side. Note that the distal end portion of the side terminal portion 12B of the roof head lining 12 is bent in an L-shape toward the vehicle transverse direction outer side, and is anchored on the outer side surface of an upper end portion 90A of a center pillar upper garnish 90.

<Structure of Inflator Mounting Bracket>

Figure 7:
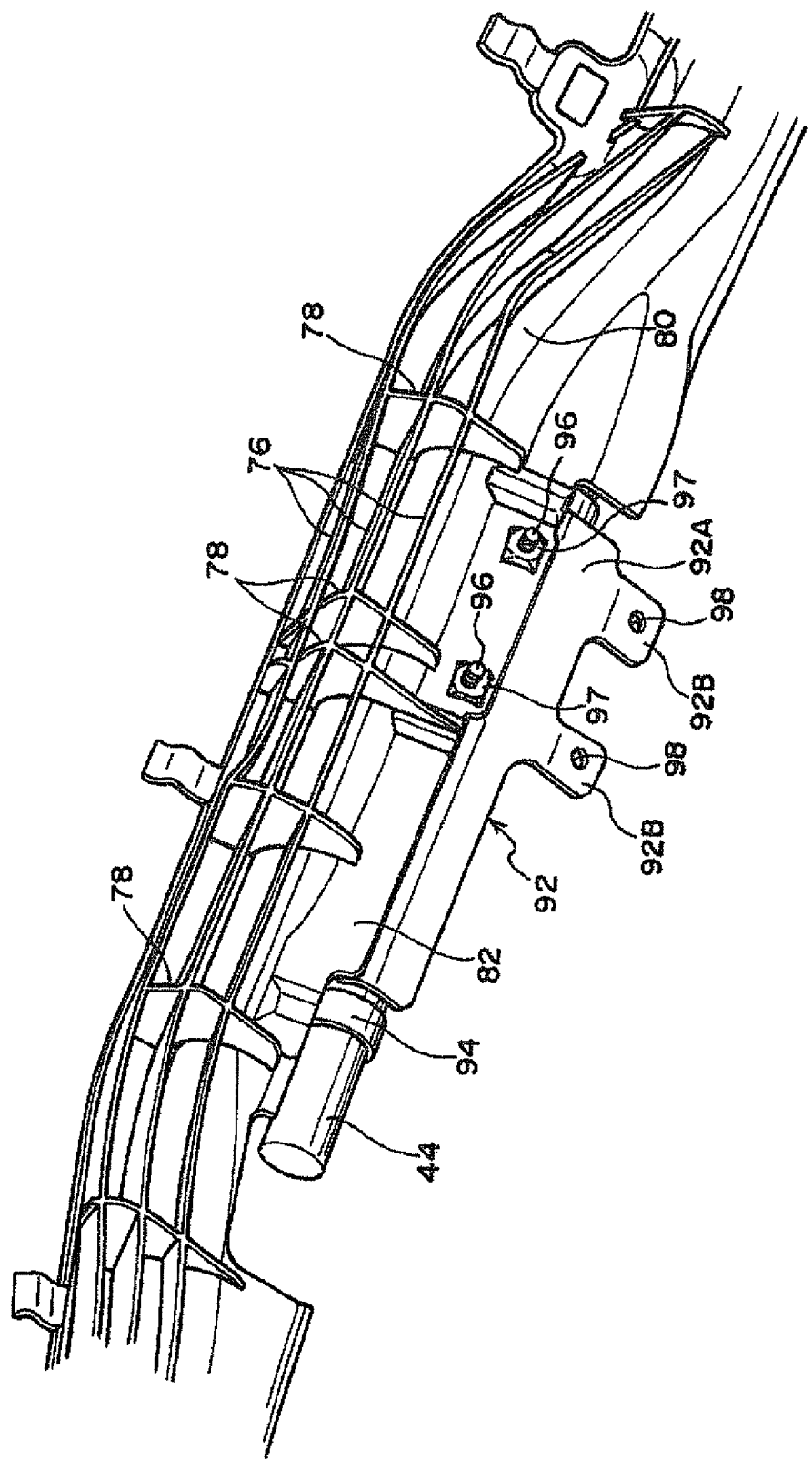
FIG. 7 is an enlarged perspective view of main portions showing, as seen from a reverse surface side, the inflator and the inflator mounting bracket shown in FIG. 6.
Figure 8:
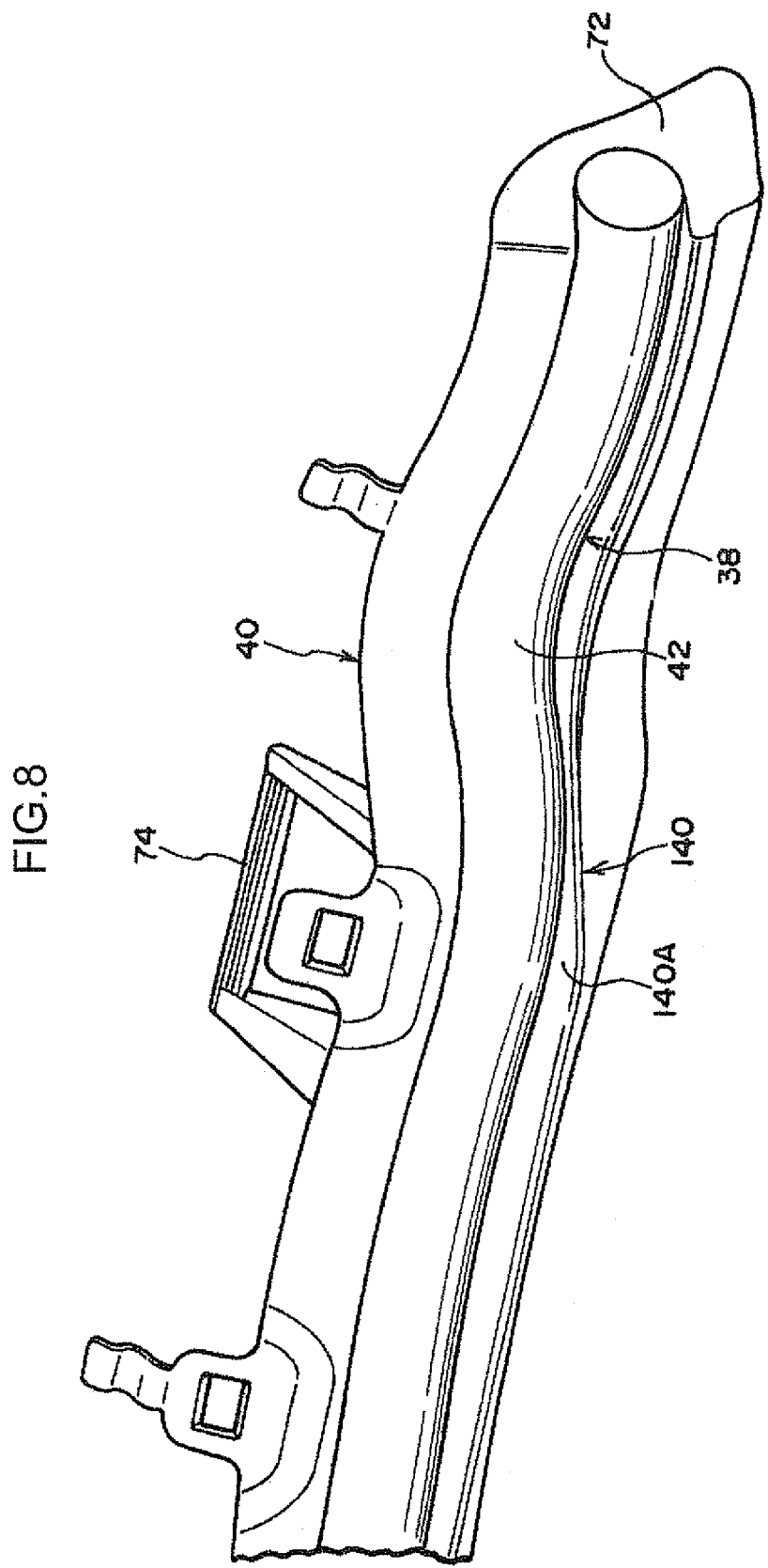
FIG. 8 is an enlarged perspective view of main portions centering around a jump stand at a C-pillar section.

The inflator mounting bracket 92, at which the inflator 44 is mounted (fixed), is placed at the inflator mounting portion 82. As shown in FIG. 6 and FIG. 7 as well, the inflator 44 is caulked and fixed to the inflator mounting bracket 92 by the pair of front and rear clamps 94 that are respectively formed in band shapes. Further, the inflator mounting bracket 92 is structured to include a bracket main body portion 92A that supports the inflator 44, and a pair of front and rear mounting leg portions 92B that extend in parallel from the lower end portion of the bracket main body portion 92A toward the pillar lower side. Note that the inflator mounting bracket 92 is formed of metal. Further, the pair of stud bolts 96 is provided so as to stand at the reverse surface side of the bracket main body portion 92A.

Further, as shown in FIG. 1, the pair of front and rear mounting leg portions 92B hang-down from the lower end of the side terminal portion 12B of the roof head lining 12 toward the vehicle lower side as seen from the vehicle cabin inner side. Accordingly, in the state before mounting the center pillar upper garnish 90, the pair of front and rear mounting leg portions 92B are in a state of being exposed at the vehicle cabin inner side. Mounting holes 98 are respectively formed at these mounting leg portions 92B as well, and at correspondence therewith, mounting holes 102 are formed coaxially with the mounting holes 98 at a pillar inner panel 100 of the center pillar 52 as well. Then, bolts 104 are inserted into the both mounting holes 98, 102 from the vehicle cabin inner side, and further, due to the bolts 104 being fastened and fixed with weld nuts 105 that are welded to the reverse surface of the center pillar inner panel 100, the inflator mounting bracket 92 is fixed to the pillar inner panel 100 of the center pillar 52.

Moreover, excess length portions 106 are formed integrally with the pair of front and rear mounting leg portions 92B of the inflator mounting bracket 92. The excess length portions 106 are formed integrally with the root sides of the mounting leg portions 92B (i.e., between the lower end portion of the inflator 44 and the fixing point of the inflator mounting bracket 92 to the center pillar 52). Further, the excess length portions 106 are formed in V-shapes that project-out toward the vehicle cabin inner side.

To supplementarily describe this, as shown by the two-dot chain line in FIG. 9, in a case in which the pillar inner panel 100 of the center pillar 52 is apart, toward the vehicle transverse direction outer side, from the inflator mounting bracket 92, and a withdrawal space 108 (as a space in which an energy absorbing stroke can be increased) exists between the both, even if the excess length 106 portions are not formed, the inflator 44 can withdraw toward the withdrawal space 108 side at the time when the head portion of the vehicle occupant abuts the side terminal portion 12B of the roof head lining 12, and therefore, the excess length portions 106 do not have to be provided. However, in a case in which the pillar inner panel 100 is at the position shown by the solid line in FIG. 9, there is no withdrawal space 108 of the inflator 44, and therefore, it is good to set the excess length portions 106 and let the inflator 44 escape toward the vehicle upper side. In this sense, an example in which the excess length portions 106 are provided is shown in FIG. 9, and an example in which the excess length portions 106 are not provided is shown in FIG. 6 and FIG. 7.

Further, as shown in FIG. 9, engaging portions 110, that are engaged with the inner sides of the cross-sections of the above-described excess length portions 106, are formed integrally with the lower end portion of the inflator mounting portion 82 of the cover 40. The engaging portions 110 are formed such that the longitudinal sectional shapes thereof are substantially triangular as seen from the vehicle rear side. Due to the engaging portions 110 engaging with the excess length portions 106, the relative positioning between the cover 40 and the inflator mounting bracket 92 is carried out.

<Ceiling Temporary Placing Structure Using Assist Grips and Ceiling Mounting Structure>

The longitudinal sectional structure at the placed position of the assist grip 112 is shown in FIG. 10. As shown in this drawing, the assist grip 112 is structured to include a base portion 114, and a grip portion 116 that is rotatably supported at the base portion 114. The base portion 114 is formed of resin, and has a fastener 117. The fastener 117 is structured by a resin claw 118 and a metal clip 126. The resin claw 118 (refer to the two-dot chain line in FIG. 10) that serves as a temporary fixing member is structured as a claw that is elastically deformable toward the far side and the near side of the surface of the drawing of FIG. 10. When assembling the ceiling module 10, this resin claw 118 is inserted in a mounting hole 120 that is formed at the roof head lining 12 and a mounting hole 122 that is formed at the cover 40, and is elastically engaged with the peripheral edge portion of the mounting hole 122. Due thereto, the curtain airbag device 14 is structured so as to be temporarily placed at (temporarily fixed to) the roof head lining 12 by using the assist grip 112.

Moreover, a heightwise wall 40A, that is extended in the direction of moving away from the side terminal portion 12B of the roof head lining 12 (toward the vehicle upper side), is formed at the vehicle cabin inner side end portion at the cover 40. An escape hole 123 that extends in the vehicle vertical direction is formed at the heightwise wall 40A. Further, a folded-back portion 40B, whose cross-sectional configuration is L-shaped, is formed at the upper end portion of the heightwise wall 40A. A bent end portion 124B, that is provided at the vehicle cabin inner side end portion of a bracket 124 that is described below, is disposed at the vehicle lower side of the folded-back portion 40B so as to face upward and downward. The bent end portion 124B is disposed at a slight incline so as to have a downward slope toward the vehicle transverse direction outer side. Note that the bent end portion 124B may be placed in the escape hole 123, or may be disposed so as to face the escape hole 123, and it suffices for the bent end portion 124B to be disposed at a position opposing the folded-back portion 40B in the vehicle vertical direction. Due thereto, at the time of fixing the ceiling module 10 to the roof side rail 16, the folded-back portion 40B is placed on the bent end portion 124B as shown by the two-dot chain line in FIG. 10, and the ceiling module 10 is temporarily placed at the bracket 124.

On the other hand, the bracket (base) 124 is mounted to the roof side rail inner panel 22 at a position opposing the assist grip 112 in the vehicle transverse direction. The bracket 124 is extended from the roof side rail inner panel 22 toward the vehicle transverse direction inner side, and a peak wall portion 124A thereof is extended in a direction that is inclined a predetermined angle toward the vehicle cabin inner side with respect to the vehicle vertical direction. Then, the cover 40 and the side terminal portion 12B of the roof head lining 12 are superposed in two layers in that order on the peak wall portion 124A of the bracket 124, and, by elastically anchoring a claw 126A of the distal end portion of the metal clip 126 with an anchor hole 128 that is formed at the peak wall portion 124A of the bracket 124, the side terminal portion 12B of the roof head lining 12 is fixed to the body (the bracket 124 of the roof side rail inner panel 22) in a state in which the cover 40 is sandwiched between the side terminal portion 12B of the roof head lining 12 and the peak wall portion 124A of the bracket 124.

<Holding Structure of Antenna/Wire Harness>

Figure 11:
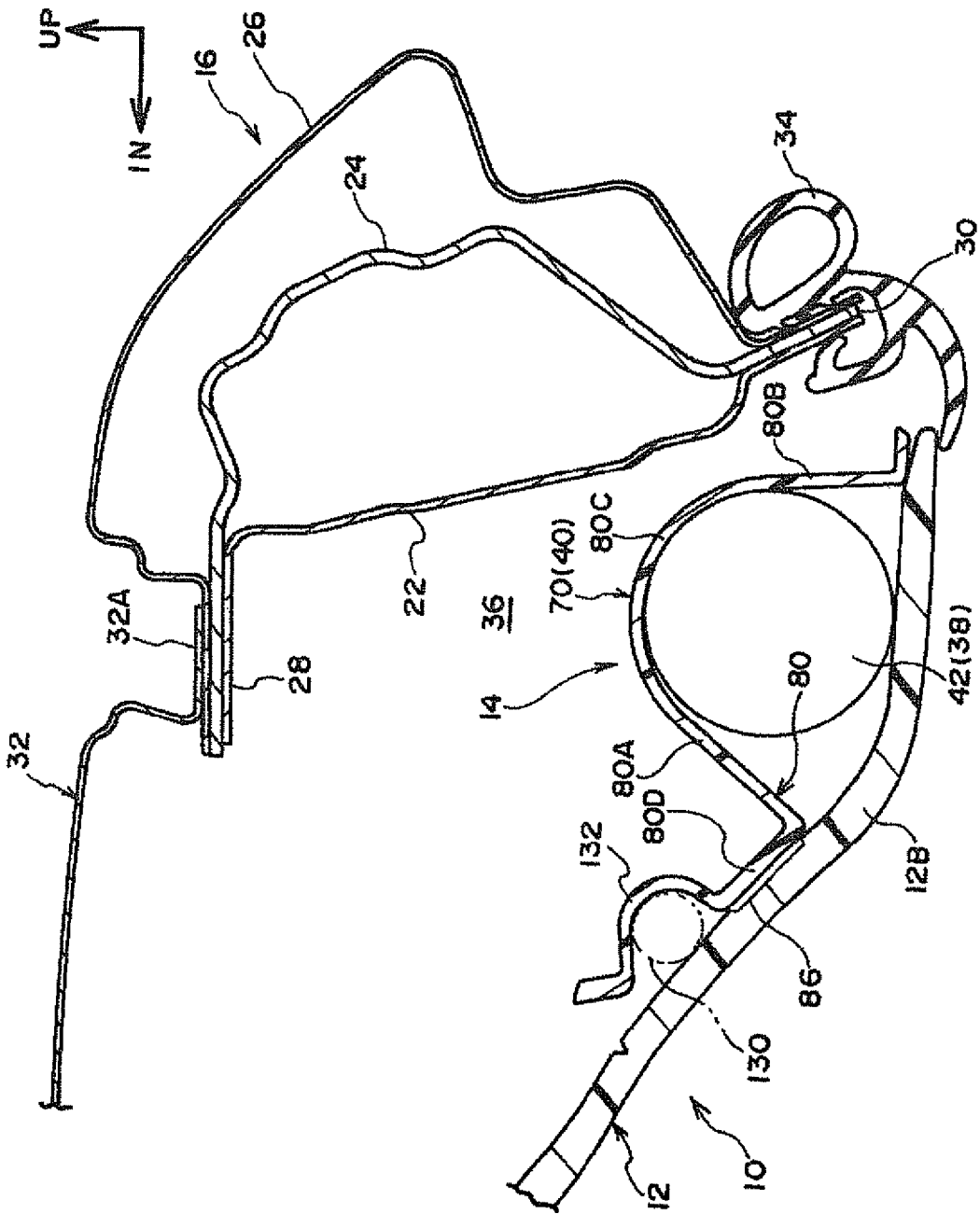
FIG. 11 is an enlarged sectional view of main portions showing, in an enlarged manner, a state cut along line F11-F11 of FIG. 1.
Figure 12:
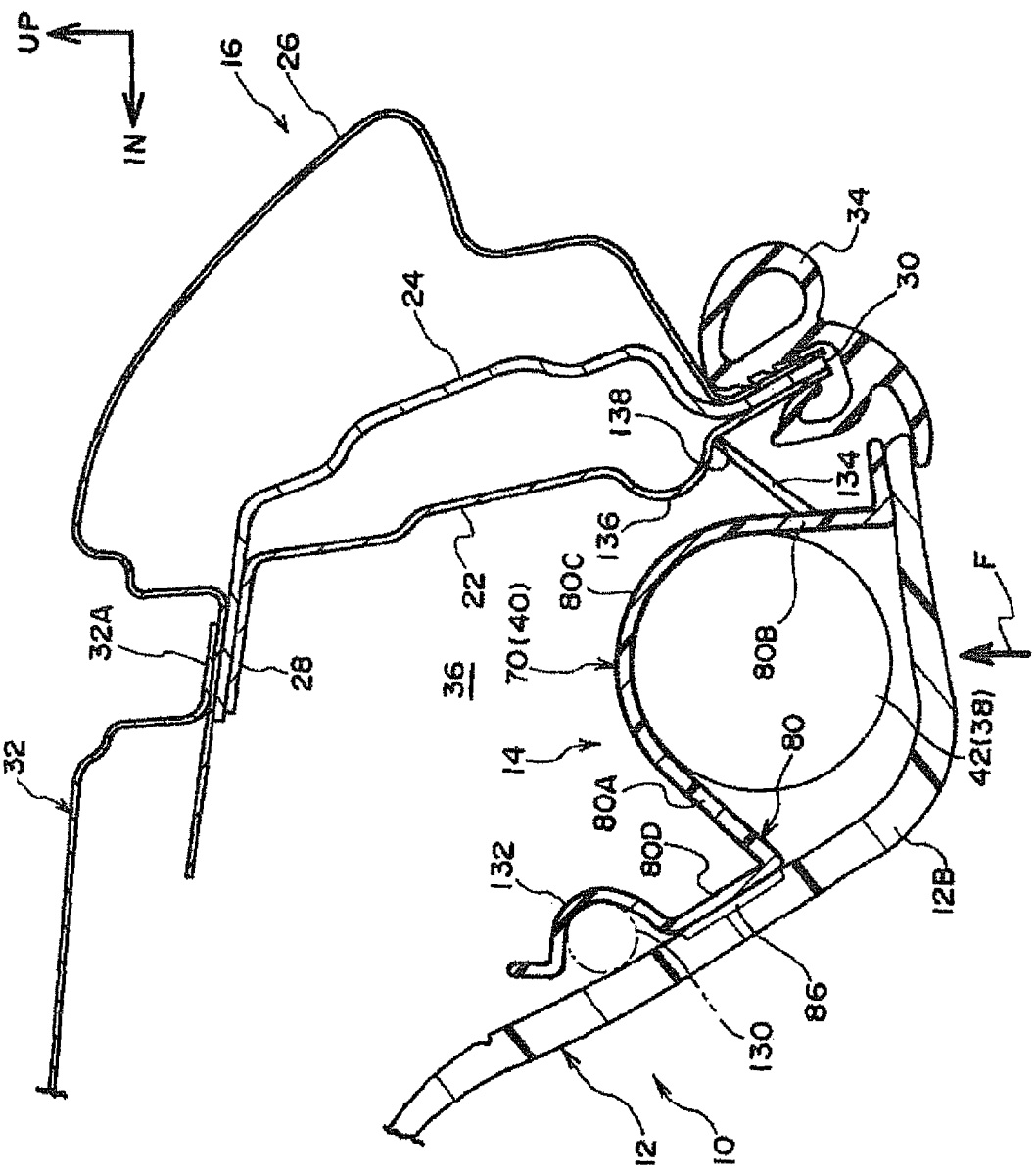
FIG. 12 is an enlarged sectional view of main portions showing, in an enlarged manner, a state cut along line F12-F12 of FIG. 1.

Further, the holding structure of an antenna 130 is shown in FIG. 11 and FIG. 12. Concretely, a holding portion 132 that is shaped as an upside-down U is formed integrally at an appropriate position of the inner leg portion 80A of the cover 40, via the welded portion 86 by hot melting. The holding portion 132 is structured so as to be elastically deformable with the welded portion 86 being the fixed end and the distal end portion being the free end. The antenna 130 that serves as a wiring article is held between the holding portion 132 and the top surface of the roof head lining 12. Note that a wiring article such as a wire harness or the like may be held in addition to the antenna 130.

<Inadvertent Flexure Suppressing Structure of Side Terminal Portion of Roof Head Lining>

A structure for suppressing inadvertent flexure (looseness) of the side terminal portion 12B of the roof head lining 12 is shown in FIG. 12. As shown in this drawing, displacement limiting portions 134, that are shaped as projections and extend at an upward incline and toward the vehicle transverse direction outer side, are formed integrally with the outer leg portion 80B that structures a portion of the bag accommodating portion 80 of the cover 40. The displacement limiting portions 134 are set at several places in the longitudinal direction of the cover 40. Further, the distal end portions of the displacement limiting portions 134 are positioned in a vicinity of the lower end flange portion 30 of the roof side rail inner panel 22. A swollen portion 136 that swells toward the vehicle chamber inner side is formed integrally with the lower portion of the roof side rail inner panel 22. Further, the distal end portions of the displacement limiting portions 134 abut or are adjacent to a rounded corner portion 138 at which the swollen portion 136 and the lower end flange portion 30 intersect. Due thereto, even if the vehicle occupant inadvertently pushes the side terminal portion 12B of the roof head lining 12 by his/her hand (the pushing force at this time is shown by arrow F in FIG. 12), due to the distal end portions of the displacement limiting portions 134 hitting the corner portion 138 and limiting the displacement of the cover 40 toward the vehicle upper side, inadvertent flexing of the side terminal portion 12B of the roof head lining 12 is limited.

<C-Pillar Portion Jump Stand Structure>

Figure 13:
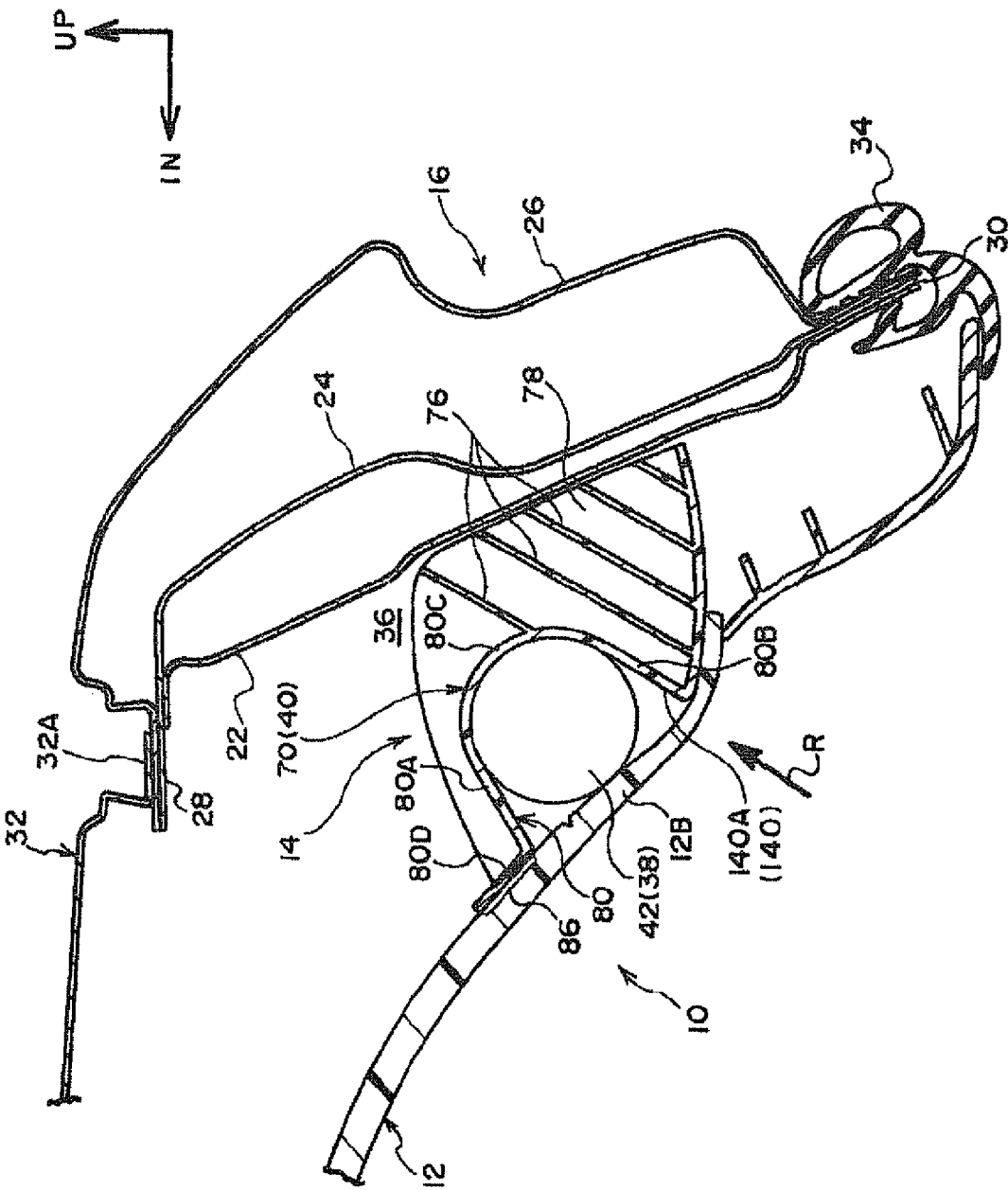
FIG. 13 is an enlarged sectional view of main portions showing, in an enlarged manner, a state cut along line F13-F13 of FIG. 1.

The structure of a jump stand at the rear pillar 20 (see FIG. 1. hereinafter appropriately called "C-pillar") portion is shown in FIG. 13 and FIG. 14. As shown in these drawings, the curtain airbag 42 is accommodated by the bag accommodating portion 80 of the cover 40 between the bag accommodating portion 80 and the top surface of the roof head lining 12.

As described above, the lateral ribs 76 are disposed in parallel at predetermined intervals in the space at the side opposite to the bag accommodating portion 80 of the above-described cover 40. The lateral ribs 76 that are disposed at this region are disposed in parallel with respect to the outer leg portion 80B of the bag accommodating portion 80 of the cover 40. Further, this outer leg portion 80B also serves as a jump stand 140 at the rear pillar 20. Accordingly, the top surface of the jump stand 140 is a guide surface 140A that limits the expanding direction of the curtain airbag 42. In other words, at the C-pillar portion, the lateral ribs 76 are disposed in the application direction of reaction force R (see FIG. 13) that the cover 40 receives at the time of expansion of the curtain airbag 42, and, due thereto, a metal bracket of the jump stand, that was conventionally placed at the C-pillar portion, is eliminated. Further, the roof side rail inner panel 22 is disposed adjacent to the vehicle transverse direction outer sides of these lateral ribs 76. Due thereto, the aforementioned reaction force is transmitted to the roof side rail inner panel 22 via the lateral ribs 76. Simultaneously, when the side terminal portion 12B of the above-described roof head lining 12 is pushed by the hand of a vehicle occupant, the side terminal portion 12B flexing inadvertently is limited (looseness is prevented). Note that, in FIG. 13, the assist grip 142 at the rear side is illustrated by the two-dot chain line (the imaginary line), and the assist grip 142 is fastened and fixed to the roof side rail inner panel 22 by a bolt 144 and a weld nut 146.

<Expanding Method of Curtain Airbag>

Figure 15A:
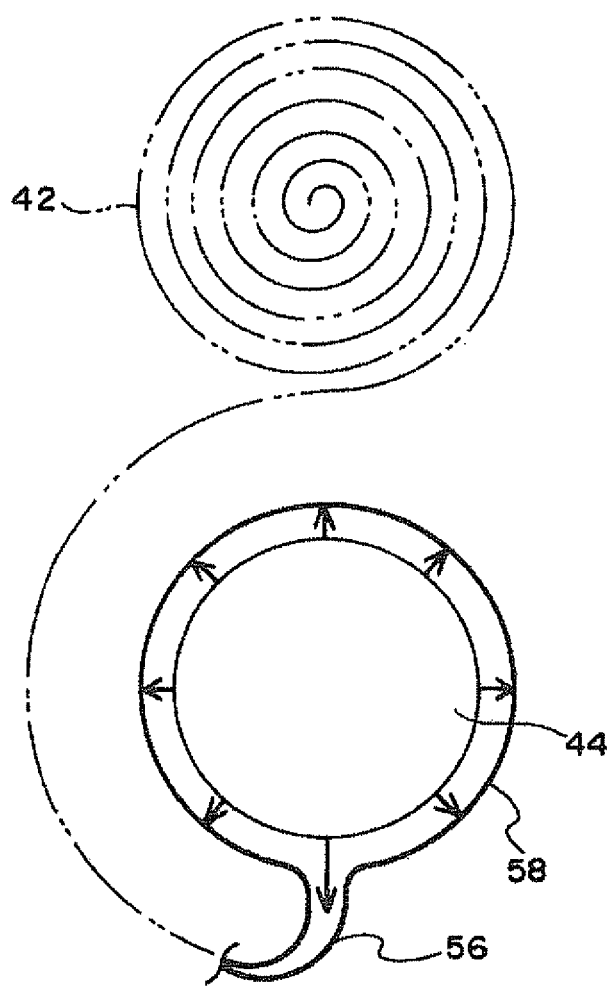
FIG. 15A is a longitudinal sectional view schematically showing an expanding method of the curtain airbag relating to the first embodiment.
Figure 15B:
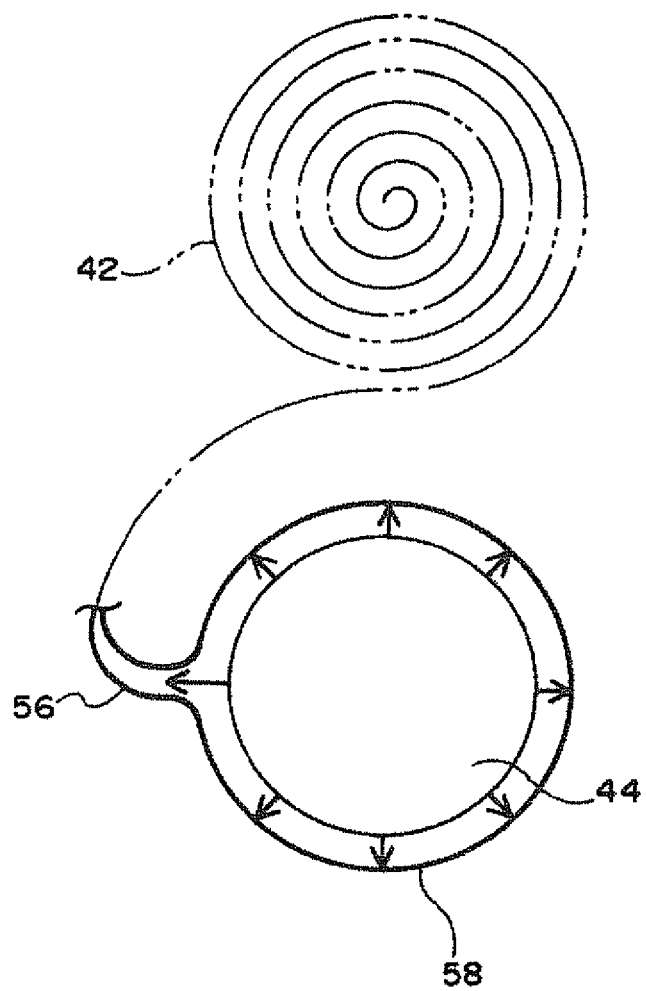
FIG. 15B is a longitudinal sectional view schematically showing a modified example of an expanding method of the curtain airbag relating to the first embodiment.
Figure 15C:
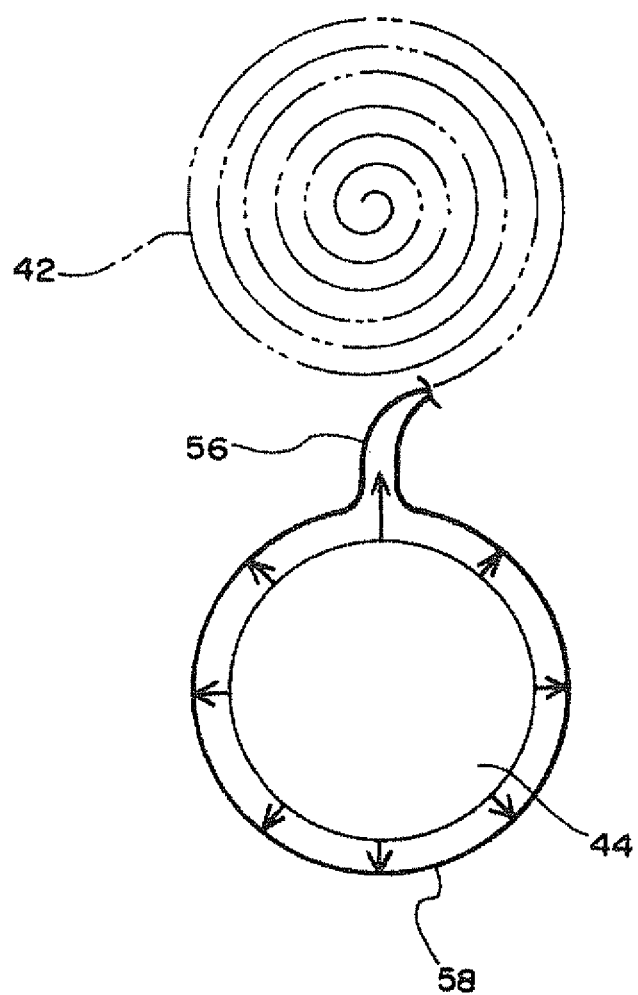
FIG. 15C is a longitudinal sectional view schematically showing an expanding method of the curtain airbag relating to a comparative example.

Next, the expanding method of the curtain airbag 42 is described by using FIG. 15A through FIG. 15C. FIG. 15A through FIG. 15C illustrate the peripheral direction positions (clocking) of the connecting portion 56 that communicates the communicating portion 50 and the inflator insertion portion 58 of the curtain airbag 42 with respect to the inflator 44. In FIG. 15A, the position of the connecting portion 56 is directed directly downward (in the direction of 6:00 of a clock). Further, the roll-folded curtain airbag 42 is disposed above the inflator 44. Moreover, the roll direction (rolling direction) of the rolled folding of the curtain airbag 42 is counterclockwise in FIG. 15A. Further, the structure shown in FIG. 15A is employed also in the present aspect (see FIG. 9).

However, FIG. 15A through FIG. 15C are figures that are drawn schematically, and the connecting portion 56 does not necessarily have to be disposed so as to face directly below the inflator 44 as shown in FIG. 15A. As shown in FIG. 15B, the connecting portion 56 may be disposed so as to face the vehicle transverse direction inner side (the direction of 9:00 of a clock), and it is desirable that the connecting portion 56 be made to face the expanding direction of the curtain airbag 42. Further, the permissible range thereof is between FIG. 15A and FIG. 15B (the range from 6:00 to 9:00 of a clock). Accordingly, FIG. 15C is a comparative example, and in this comparative example, the connecting portion 56 is disposed so as to face directly above the inflator 44. The expanding directions of the curtain airbag 42 shown in FIG. 15A and FIG. 15B are appropriate. The reason why the expanding direction of the curtain airbag shown in FIG. 15C is inappropriate is explained in the effects of the embodiments part.

(Operation/Effects of Present Embodiment)

The operation and effects of the present embodiment are described next.

First, the assembly processes are described. First, the airbag modules 38 are mounted to the covers 40, and the curtain airbag devices 14 are structured. Next, the curtain airbag devices 14 are temporarily placed at the roof head lining 12. Concretely, the pairs of handles 74 formed at the covers 40 are grasped, and the curtain airbag devices 14 are placed on the top surfaces of the pair of left and right side terminal portions 12B of the roof head lining 12. Next, the bent portions 80D of the covers 40 are welded at several places by hot melting to the top surface of the roof head lining 12, and the resin claws 118 of the assist grips 112, 142 are inserted into the mounting holes 120 formed at the roof head lining 12 and the mounting holes 122 formed at the covers 40, and are elastically engaged with the peripheral edge portions of the mounting holes 122. Due thereto, the curtain airbag devices 14 are temporarily placed at the roof head lining 12, and the ceiling module 10 is formed.

Next, this ceiling module 10 is made to span between the pair of left and right roof side rails 16 and is fixed. Namely, the ceiling module 10 is placed between the pair of left and right roof side rails 16, and the bent end portions 40B formed at the vertical wall portions 40A of the covers 40 are placed at the bent end portions 124B of the brackets 124 of the roof side rails 16. Due thereto, as shown by the two-dot chain line in FIG. 10, the ceiling module 10 is temporarily placed in a state of hanging down from the brackets 124. Further, in the state in which the ceiling module 10 is temporarily placed at the brackets 124, the left and right pairs of the mounting leg portions 92B of the inflator mounting brackets 92 hanging down on the center pillars 52 can be seen. Thus, the worker does not perform upward-facing work (ceiling work), and fixes the left and right pairs of the mounting leg portions 92B to the center pillar inner panels 100 by the bolts 104 and the weld nuts 105. Moreover, the claws 126A of the metal clips 126 of the assist grips 112, 142 are elastically anchored to the anchor holes 128 that are formed at the peak wall portions 124A of the brackets 124 that are set at the roof side rail inner panels 22. The work for assembling the ceiling module 10 to the vehicle body is thereby finished.

Next, the operation of the curtain airbag device 14 is summarized. At times other than the time of a side collision, the vehicle having side-collided is not detected by an unillustrated side collision sensor. Accordingly, the inflator 44 does not operate. When, from this state, there becomes the time of a side collision, the vehicle having side-collided is detected by the unillustrated side collision sensor, and the detection signal thereof is outputted to an airbag ECU. Therefore, ignition current is sent by the airbag ECU to an ignition device of the inflator 44. Due thereto, the inflator 44 operates and gas is generated. This gas is supplied into the curtain airbag 42 that is housed in a folded-up state. Therefore, the curtain airbag 42 inflates such that the rolled folding thereof comes undone, and is expanded into a curtain shape beneath the roof side rail 16 while flexing the side terminal portion 12B of the roof head lining 12 toward the vehicle cabin inner side. Note that the curtain airbag device 14 may be operated when it is detected by an unillustrated roll-over sensor that the vehicle has rolled-over, and not only at the time of a side collision. At this time, due to the curtain airbag 42 sliding along the jump stand 88 at the B-pillar portion and the jump stand 140 at the C-pillar portion, the expanding direction is limited to the directions of inclination of the jump stands 88, 140. Due thereto, the curtain airbag 42 is prevented from entering into the gap between the center pillar upper garnish 90 and the center pillar inner panel 100.

As described above, in the state in which the curtain airbag 42 is expanded to beneath the roof side rail 16, the front side inflating portion 46 is interposed between the head portion of a vehicle occupant seated in a front seat and the door glass of the front side door. The head portion of the vehicle occupant seated in the front seat is thereby protected. Further, the rear side inflating portion 48 is interposed between the head portion of a vehicle occupant seated in a rear seat and the door glass of the rear side door. The head portion of the vehicle occupant seated in the rear seat is thereby protected.

Here, in the present embodiment, when the ceiling module 10 is assembled to the vehicle body as described above, the inflators 44 are disposed directly above the center pillars 52, and the pairs of front and rear mounting leg portions 92B of the inflator mounting brackets 92, that are for fixing the inflators 44 to the vehicle body, are in a state of hanging-down further toward the vehicle lower side than the side terminal portions 12B of the roof head lining 12. Therefore, if the worker fixes the mounting leg portions 92B of the inflator mounting brackets 92, that are in front of his/her eyes, from the vehicle cabin inner side to the pillar inner panels 100 of the center pillars 52, the work of fixing the inflators 44 to the pillar inner panels 100 of the center pillars 42 is completed. Accordingly, the work of fixing the inflators does not become ceiling work. Further, because the inflators 44 that are heavy objects are fixed to the pillar inner panels 100 of the center pillars 52 that are vehicle body structural members, the reaction force that is applied at the time when the curtain airbag device 14 operates can be reliably received at the center pillar 52. As a result, in accordance with the present embodiment, the burden of work on the worker at the time of vehicle assembly is reduced, and the work efficiency of the worker can be improved, and further, the reaction force that is applied at the time when the curtain airbag device 14 operates can be reliably supported at the body.

Further, the airbag module 38 is fixed to the top surface of the side terminal portion 12B of the roof head lining 12 by the cover 40 that is made of resin and that is formed in an elongated shape along the airbag module 38. By fixing the airbag module 38 to the roof head lining 12 by using the cover 40 that is elongated along the airbag module 38 in this way, the airbag module 38 can be assembled in a stable state to the top surface of the side terminal portion 12B of the roof head lining 12.

Moreover, by using the cover 40, the curtain airbag 42 can be prevented in advance from hitting edges of body panels or burrs of the spot welded places or the like and being damaged, at the time when the ceiling module 10 is assembled to the vehicle body or the time when the curtain airbag 42 expands.

For these reasons, in accordance with the present embodiment, the airbag module 38 can be assembled to the roof head lining 12 and made into a sub-assembly simply and in a stable state, and the curtain airbag 42 can be protected from damage.

Moreover, when the curtain airbag 42 expands, the curtain airbag 42 is guided by the guide surfaces 88A, 140A of the jump stands 88, 140 provided at the cover 40, and expands. Because the guide surfaces 88A, 140A are extended along the expanding direction of the curtain airbag 42, the curtain airbag 42 is expanded smoothly in a predetermined expanding direction. In other words, the expanding direction of the curtain airbag 42 is limited by the guide surfaces 88A, 140A of the jump stands 88, 140. Accordingly, the curtain airbag 42 is prevented from expanding in an unplanned space between the center pillar upper garnish 90 and the center pillar inner panel 100, or the like. As a result, in accordance with the present embodiment, at the time of a side collision, the curtain airbag 42 can be expanded smoothly toward beneath the roof side rail 16.

Moreover, because the inflator 44 is disposed beneath the curtain airbag 42, the distance between the inflator 44 and the point of fixing the inflator mounting bracket 92 to the center pillar inner panel 100 is short. Accordingly, it suffices for the extended length, toward the vehicle lower side, of the pair of front and rear mounting leg portions 92B of the inflator mounting bracket 92 to be that much shorter. As a result, in accordance with the present embodiment, the reaction force that is applied when the curtain airbag 42 expands can be transferred efficiently to the center pillar 52. Further, this leads also to a reduction in weight and costs.

Moreover, in the present embodiment, the curtain airbag 42 is folded-up in the roll shape, and the connecting portion 56 with that inflator insertion portion 58 at the curtain airbag 42 in the folded-up state is disposed so as to face the substantial vehicle lower side, and therefore, gas is always jetted out toward the substantial vehicle lower side. Therefore, even when the inflator 44 is disposed lower than the curtain airbag 42, the curtain airbag 42 is reliably expanded toward the vehicle lower side. As a result, in accordance with the present embodiment, even when the inflator 44 is disposed lower than the curtain airbag 42, the curtain airbag 42 can be expanded rapidly toward the vehicle lower side.

Further, because the excess length portions 106 are provided between the inflator mounted position at the inflator mounting bracket 92 and the fixing position to the center pillar 52, when load in the direction of thrusting the side terminal portion 12B of the roof head lining 12 upward is applied thereto, the excess length portions 106 are extended (deformed). Due thereto, the inflator 44 can be displaced in the thrusting-up direction with respect to the side terminal portion 12B. Further, when the excess length portions 106 extend (plastically deform), the energy also is absorbed. As a result, in accordance with the present embodiment, there is the excellent effect that, even if the head portion of the vehicle occupant relatively strongly abuts the side terminal portion of the roof head lining 12, a large reaction force is not inputted to the head portion of the vehicle occupant from the inflator 44.

Moreover, the excess length portions 106 are structured as projecting portions that project toward the vehicle cabin inner side, and the engaging portions 110 that are provided at the cover 40 are engaged with these projecting portions. Due thereto, the positioning of the cover 40 with respect to the inflator mounting bracket 92 is easy. Accordingly, the positioning work at the time of assembling the airbag module 38 to the top surface of the side terminal portion 12B of the roof head lining 12 is easy. As a result, the work efficiency at the time of assembling the airbag module 38 to the top surface of the side terminal portion 12B of the roof head lining 12 can be improved.

Further, when load in the direction of pushing the side terminal portion 12B of the roof head lining 12 upward is applied thereto, the cover 40 that is disposed at the top surface of the side terminal portion 12B also starts to be displaced in the same direction. However, in the present embodiment, because the displacement limiting portions 134 are provided at the accommodating portion 70 of the cover 40, the displacement limiting portions 134 interfere with the corner portion 138 of the vehicle body. Therefore, the cover 40, and accordingly the side terminal portion 12B, are hardly displaced at all in the pushing-up direction of the side terminal portion 12B. As a result, in accordance with the present embodiment, when a vehicle occupant pushes the side terminal portion 12B of the roof head lining 12 by his/her hand, or the like, the side terminal portion 12B of the roof head lining 12 flexing (loosening) inadvertently can be suppressed.

Moreover, because the holding portion 132 is provided at the cover 40, a wiring article such as the antenna 130 or the like can be held at the holding portion 132. Therefore, until the ceiling module 10 is assembled in the vehicle body, a wiring article such as the antenna 130 or a wire harness or the like can be prevented from shifting from the predetermined wiring position. As a result, a wiring article such as the antenna 130 or a wire harness or the like moving and getting in the way of work can be prevented in advance, and accordingly, the work efficiency in assembling the roof head lining 12 to the vehicle body can be improved.

Further, the side terminal portion 12B of the roof head lining 12 is directly fixed, by the assist grips 112, 142, to the roof side rail 22 or to the bracket 124 provided at the roof side rail inner panel 22. At this time, the cover 40, that is disposed at the top surface of the side terminal portion 12B of the roof head lining 12, also is fixed together. Accordingly, the elongated cover 40 can be soundly fixed along the roof side rail 16.

Moreover, the fastener 117 that has both the metal clip 126, that is elastically engaged with the anchor hole 128 of the bracket 124, and the resin claw 118, that is elastically engaged with the mounting hole 122 of the cover 40, is set at the distal end portion of the assist grip 112. Before assembling the roof head lining 12 to the vehicle body, the curtain airbag devices 14 can be temporarily fixed to (temporarily placed at) the top surfaces of the side terminal portions 1213 of the roof head lining 12 (can be made into a single assembly). Accordingly, as compared with a structure in which such temporary placement cannot be carried out, the work efficiency in assembling the airbag modules 38 and the roof head lining 12 to the vehicle body can be improved, and the burden of work on the worker can be reduced.

Second Embodiment

A second embodiment of a curtain airbag device placement structure relating to the present aspect is described hereinafter by using FIG. 1 and FIG. 16. Note that structural portions that are the same as the above-described first embodiment are denoted by the same reference numerals, and description thereof is omitted.

Figure 16:
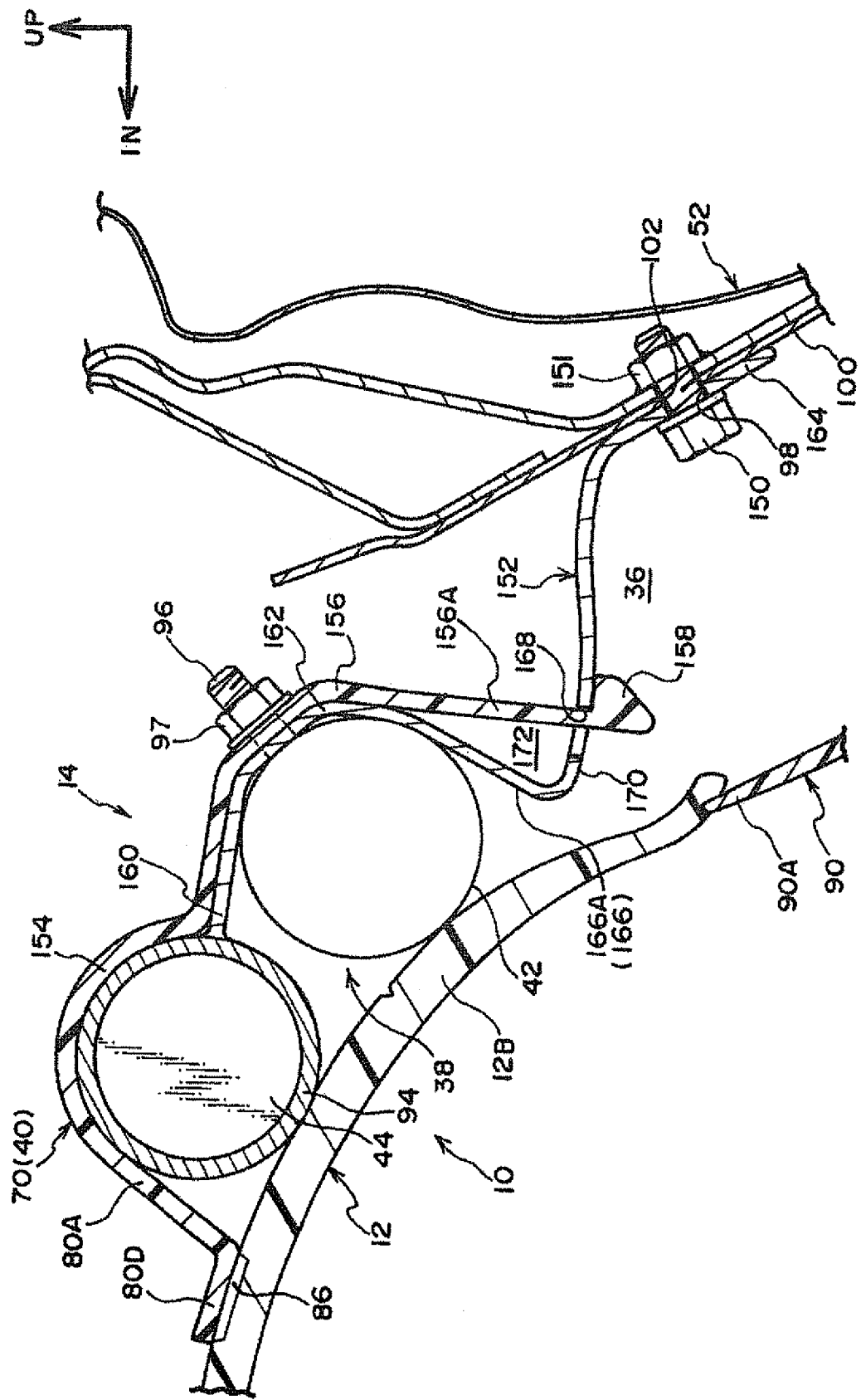
FIG. 16 shows a curtain airbag device placement structure relating to a second embodiment, and is an enlarged sectional view of main portions showing, in an enlarged manner, a state cut along line F16-F16 of FIG. 1.

As shown in FIG. 1 and FIG. 16, the second embodiment has a feature in the point that the placement relationship of the inflator 44 and the curtain airbag 42 are opposite that of the first embodiment.

To describe concretely, in the first embodiment, the inflator 44 is disposed beneath the curtain airbag 42, but, in the present embodiment, the inflator 44 is disposed above the curtain airbag 42. Note that, in FIG. 1, the placement of the inflator 44 in the case of the present embodiment is shown by the two-dot chain line. Therefore, as shown in FIG. 16, the distance from the inflator 44 to the point of fastening to the pillar inner panel 100 (the fastening position of bolts 150) is long as compared with the case of the first embodiment. In consideration of this point, as shown in FIG. 16, in the present embodiment, the length of a pair of front and rear mounting leg portions 164, that are described later and that an inflator mounting bracket 152 has, extends further toward the vehicle lower side than that of the first embodiment.

In detail, when the second embodiment is employed, because the above/below positional relationship of the inflator 44 and the curtain airbag 42 is the opposite, the bag accommodating portion 80 (see FIG. 9) of the accommodating portion 70 of the cover 40 described in the first embodiment is made to be an inflator mounting portion 154, and the inflator mounting portion 82 (see FIG. 9) is made to be a bag accommodating portion 156. Note that, in the following description using FIG. 16, for convenience of explanation, the upper stage side of the accommodating portion 70 is called the "inflator mounting portion 154", and the lower stage side of the accommodating portion 70 is called the "bag accommodating portion 156".

In the accommodating portion structure of the above-described structure, the jump stand 88 (see FIG. 9) is not formed between the inflator mounting portion 154 and the bag accommodating portion 156. Further, a lower end portion 156A of the bag accommodating portion 156 extends toward the pillar lower side, and claw portions 158, that project-out toward the vehicle transverse direction outer side, are formed integrally with the distal end portion thereof.

The inflator mounting bracket 152 is placed at the vehicle cabin inner side of the accommodating portion 70 of the cover 40. The inflator mounting bracket 152 has an inflator mounting portion 160 to which the inflator 44 is caulked and fixed by the clamps 94, a bag holding portion 162 that is extended from this inflator mounting portion 160 toward the pillar lower side and is formed in a cross-sectional shape that is substantially upside-down U-shaped, and the pair of front and rear mounting leg portions 164 that are extended from the lower end portion of this bag holding portion 162 toward the center pillar inner panel 100 so as to traverse the accommodating space 36 between the center pillar upper garnish 90 and the center pillar inner panel 100.

The stud bolts 96 are provided to stand from the outer side surface of the bottom portion of the bag holding portion 162. The studs 96 pass-through the bag accommodating portion. 156 of the cover 40, and, due to the nuts 97 being screwed-together therewith, the inflator mounting bracket 152 is fixed to the cover 40. Further, the mounting leg portions 164 are fastened and fixed to the center pillar inner panel 100 by the bolts 150 and weld nuts 151. Moreover, anchor holes 168 are formed at the bag holding portion 162 sides of the mounting leg portions 164. The claw portions 158 of the above-described cover 40 are anchored to the anchor holes 168. Due thereto, the inflator mounting bracket 152 is maintained in a state in which the accommodating portion 70 of the cover 40 is covered thereon.

Further, in this second embodiment, the angle of inclination of the lower wall of the bag holding portion 162 of the inflator mounting bracket 152 coincides with the expanding direction of the curtain airbag 42, and is used as a jump stand 166. Namely, the top surface of the jump stand 166 is a guide surface 166A that limits the expanding direction of the curtain airbag 42. Note that cross-sectional shapes, that are V-shaped and whose vehicle transverse direction outer sides are open, are formed between the jump stand 166 and the pair of front and rear mounting leg portions 164, and due to the lower end portion 156A of the cover 40 traversing these V-shaped cross-sectional portions 170 and the claw portions 158 being anchored with the anchor holes 168, closed cross-sectional portions 172 that are triangular are formed. These closed cross-sectional portions 172 suppress opening of the V-shaped cross-sectional portions 170 when the curtain airbag 42 expands, and form high-rigidity portions that support the jump stand 166.

(Operation/Effects)

In accordance with the above-described structure, at the time of a side collision, the inflator 44 operates, the curtain airbag 42 slides on the guide surface 166A of the jump stand 166, and the side terminal portion 12B of the roof head lining 12 is pushed-open toward the vehicle cabin inner side and is expanded toward beneath the roof side rail 16.

Here, in the present embodiment, because the inflator 44 is disposed above the curtain airbag 42, it can be applied even to cases of a body structure in which the inflator 44 cannot be disposed beneath the curtain airbag 42. Accordingly, there is the advantage that the degrees of freedom in application to vehicle types can be increased.

Note that, in the above-described first embodiment and second embodiment, in FIG. 1, the inflator 44 is disposed directly above the center pillar 52, but is not limited to the same, and the inflator may be disposed at a position that is offset toward the vehicle rear side or the vehicle front side with respect to the center pillar. In this case, it suffices to extend, by the amount of the offset, the mounting leg portions of the inflator mounting bracket toward the vehicle rear side or the vehicle front side.

The invention claimed is:

1. A curtain airbag device placement structure comprising:
an airbag module that is structured to include a curtain airbag folded-up in an elongated shape and an inflator supplying gas to the curtain airbag at a time of a side collision or a time of roll-over, and that is assembled in advance to a top surface of a side terminal portion of a roof head lining, wherein a lower end portion of an inflator mounting bracket for fixing the inflator to a vehicle body is extended further toward a vehicle lower side than the side terminal portion of the roof head lining, and the inflator mounting bracket is fixed to an intermediate pillar at the extended lower end portion of the inflator mounting bracket.

2. The curtain airbag device placement structure of claim 1, wherein the inflator is disposed directly above the intermediate pillar.

3. The curtain airbag device placement structure of claim 1, wherein
the airbag module is fixed to the roof head lining by a cover that is made of resin and that is formed in an elongated shape along the airbag module.

4. The curtain airbag device placement structure of claim 3, wherein
an expanding direction limiting portion, that is extended along an expanding direction of the curtain airbag and has a guide surface of a time when the curtain airbag expands, is provided at the cover or the inflator mounting bracket.

5. The curtain airbag device placement structure of claim 1, wherein
the inflator is disposed beneath the curtain airbag.

6. The curtain airbag device placement structure of claim 5, wherein the curtain airbag is folded-up in a roll shape, and an inflator insertion portion, into which a gas jetting portion of the inflator is inserted, is formed at an upper edge central portion of the curtain airbag, and
further, a connecting portion with the inflator insertion portion at the curtain airbag in a folded-up state is disposed facing toward a vehicle lower side.

7. The curtain airbag device placement structure of claim 1, wherein
the inflator is disposed above the curtain airbag.

8. The curtain airbag device placement structure of claim 1, wherein
excess length portions are provided between an inflator mounted position at the inflator mounting bracket and a fixing position to the intermediate pillar.

9. The curtain airbag device placement structure of claim 8, wherein the excess length portions are structured as projecting portions that project toward a vehicle cabin inner side, and
engaging portions engageable with the projecting portions are provided at the cover.

10. The curtain airbag device placement structure of claim 3, wherein
an accommodating portion, that accommodates the curtain airbag and the inflator between the accommodating portion and the side terminal portion of the roof head lining, is formed at the cover, and
a displacement limiting portion, that, when the accommodating portion is displaced in a pushing-up direction of the side terminal portion of the roof head lining, interferes with the vehicle body and limits displacement of the side terminal portion of the roof head lining, is provided at an outer side of the accommodating portion.

11. The curtain airbag device placement structure of claim 3, wherein
a holding portion, that holds a wiring article that is wired at a top surface side of the side terminal portion of the roof head lining, is provided at the cover.

12. The curtain airbag device placement structure of claim 3, wherein
- a base for fixing a assist grip is provided at the roof side rail, and
- the side terminal portion of the roof head lining is fixed, together with the cover, to the base by the assist grip.

13. The curtain airbag device placement structure of claim 12, wherein
- a fastener, that is elastically engaged with a mounting hole of the base, is set at a distal end portion of the assist grip, and
- the fastener also functions as a temporary fixing member that temporarily fixes the airbag module and the cover to the side terminal portion of the roof head lining.

* * * * *